(12) United States Patent
Yamashita

(10) Patent No.: US 9,030,849 B2
(45) Date of Patent: May 12, 2015

(54) SWITCHING POWER SUPPLY DEVICE AND SEMICONDUCTOR DEVICE

(75) Inventor: Tetsuji Yamashita, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 232 days.

(21) Appl. No.: 13/696,037

(22) PCT Filed: Jun. 15, 2010

(86) PCT No.: PCT/JP2010/003962
§ 371 (c)(1),
(2), (4) Date: Nov. 2, 2012

(87) PCT Pub. No.: WO2011/015284
PCT Pub. Date: Dec. 22, 2011

(65) Prior Publication Data
US 2013/0051088 A1    Feb. 28, 2013

(51) Int. Cl.
*H02M 3/335*    (2006.01)
*H02M 1/36*    (2007.01)
*H02M 1/00*    (2006.01)

(52) U.S. Cl.
CPC ............ *H02M 1/36* (2013.01); *H02M 3/33523* (2013.01); *H02M 2001/0048* (2013.01); *Y02B 70/1491* (2013.01)

(58) Field of Classification Search
USPC ......... 363/16–20, 21.06, 21.09, 21.12, 21.14, 363/21.16, 56.01, 56.03, 79, 97; 323/282, 323/285, 288, 313; 307/116, 119
See application file for complete search history.

(56) References Cited

U.S. PATENT DOCUMENTS

| 5,038,373 | A  | * | 8/1991  | Schunk et al. ............. 379/93.09 |
| 6,529,391 | B2 | * | 3/2003  | Yoshinaga et al. ......... 363/21.15 |
| 6,542,388 | B2 | * | 4/2003  | Amei .......................... 363/56.01 |
| 7,075,802 | B2 |   | 7/2006  | Yamashita |
| 7,285,991 | B2 | * | 10/2007 | Yamashita .................... 327/108 |

(Continued)

FOREIGN PATENT DOCUMENTS

| JP | 2005-287261 A | 10/2005 |
| JP | 2006-136034 A | 5/2006 |

(Continued)

OTHER PUBLICATIONS

International Search Report issued in International Patent Application No. PCT/JP2010/003962 dated Aug. 17, 2010.

*Primary Examiner* — Rajnikant Patel
(74) *Attorney, Agent, or Firm* — McDermott Will & Emery LLP

(57) ABSTRACT

In a switching power supply device which intermittently executes a switching operation, a power loss which occurs in resumption of the switching operation is reduced. A semiconductor device works as a control circuit for the switching power supply device, and includes: an intermittent oscillation control circuit which alternately gives an instruction for execution and suspension of the switching operation of a switching element; a bottom detecting circuit which detects a bottom of a ringing voltage that develops when the switching element is OFF; a bottom-monitoring time period timing circuit which times a bottom-monitoring time period starting as soon as the instruction for the execution of the switching operation is given; and a turn-on control circuit which turns ON, before the timing of the bottom-monitoring time period ends, the switching element only when the bottom of the ringing voltage is detected.

15 Claims, 19 Drawing Sheets

(56) References Cited

U.S. PATENT DOCUMENTS

| | | | |
|---|---|---|---|
| 7,394,670 B2 * | 7/2008 | Koike | 363/21.16 |
| 7,511,929 B2 * | 3/2009 | Hachiya | 361/18 |
| 2005/0219776 A1 | 10/2005 | Yamashita | |
| 2006/0092671 A1 | 5/2006 | Yamashita | |
| 2007/0121258 A1 | 5/2007 | Hachiya | |
| 2009/0153116 A1 * | 6/2009 | Hachiya | 323/282 |

FOREIGN PATENT DOCUMENTS

| | | |
|---|---|---|
| JP | 2007-174890 A | 7/2007 |
| JP | 4033850 | 11/2007 |
| JP | 4033855 | 11/2007 |

* cited by examiner

SWITCHING POWER SUPPLY DEVICE AND SEMICONDUCTOR DEVICE

RELATED APPLICATIONS

This application is the U.S. National Phase under 35 U.S.C. §371 of International Application No. PCT/JP2010/003962 filed on Jun. 15, 2010, the disclosure of which application is incorporated by reference herein.

TECHNICAL FIELD

The present invention relates to (i) a switching power supply device which generates a regulated output voltage by causing a switching element to intermittently execute a switching operation to supply and cut an input voltage and (ii) a semiconductor device for controlling the switching power supply device.

BACKGROUND ART

Switching power supply devices including semiconductor devices have been widely used for household equipment, such as electric appliances, as its power supply devices in order to reduce its electric consumption and improve its power efficiency. The semiconductor devices utilize a switching operation performed by semiconductor (a switching element, such as a transistor) to control (to stabilize) an output voltage.

Recently, in particular, global warming prevention measures have drawn a significant attention to the reduction of the stand-by electricity consumed by electric devices, such as the household appliances. This trend generates a great demand for a switching power supply device consuming less stand-by electricity.

In most cases, a typical energy loss of a switching power supply under the light load, such as a stand-by load, is due to a switching loss caused by a switching operation. One of the techniques to improve power efficiency under the light load, such as the stand-by load, is to employ intermittent oscillation control which intermittently carries out a switching operation under the light load.

FIG. 16 depicts a functional block diagram exemplifying a structure of a switching power supply device 900 including a control circuit 901 which carries out conventional intermittent oscillation. Briefly described below is a switching operation by the intermittent oscillation control in the switching power supply device 900, with reference to a timing diagram in FIG. 17.

In the switching power supply device 900 shown in FIG. 16, the switching operation is carried out via quasi-resonant control (also referred to as bottom-on control) in a current mode. In the quasi-resonant control in a current mode, a switching element 2 turns OFF when a current $I_D$ flowing in the switching element 2 reaches its target value, and turns ON at the bottom; that is, the local minimum point of a ringing voltage which develops in the switching element 2 when the switching element is OFF. The bottom of the ringing voltage is detected by a bottom detecting circuit 17, and is indicated by a signal Bottom outputted from the bottom detecting circuit 17.

In the load varying state in FIG. 17, an output voltage $V_{out}$ increases as an output current $I_{out}$ gets out of the load rated state and decreases. A feedback signal $I_{FB}$ (for example, a current signal which flows out of the control circuit, and increases as the output voltage $V_{out}$ increases) indicating the magnitude of the output voltage $V_{out}$ is provided from an output voltage detecting circuit 6 to an FB terminal. As the output voltage $V_{out}$ is greater, a feedback control circuit 12 outputs, based on the feedback signal $I_{FB}$, a control signal $V_{EAO}$ indicating a smaller limiting value with respect to a current $I_D$ flowing in a switching element 2.

When the load becomes even smaller, an intermittent oscillation control circuit 18 brings a signal Enable low so that the low signal Enable indicates a suspension of the switching operation. Once the signal Enable goes low, the signal Bottom is cut by a turn-on control circuit 93. This operation suspends the switching operation in the switching element 2.

There is an edge at which the signal Enable goes low to indicate the suspension of the switching operation. This edge is also referred to as an intermittent suspension signal. Suspension of the switching operation caused by the intermittent oscillation control is also referred to as intermittent suspension.

As the switching operation is kept suspended, the output voltage $V_{out}$ decreases. Thus, the intermittent oscillation control circuit 18 brings the signal Enable high so that the high signal Enable indicates execution of the switching operation. An intermittent resuming circuit 91 outputs a signal Up, which is a one-shot pulse, at a rising edge of the signal Enable. The signal Up forces the switching element 2 to turn ON. Then, the switching operation is executed via the quasi-resonant control that turns ON the switching element 2 based on the signal Bottom from the bottom detecting circuit 17.

There is an edge at which the signal Enable goes high so that the high signal Enable indicates execution of the switching operation. This edge is also referred to as an intermittent resuming signal. Resumption of the switching operation via the intermittent oscillation control is also referred to as intermittent resumption.

Thus, in a first stand-by state in FIG. 17, the intermittent oscillation control is carried out to alternatively suspend and execute the switching operation on the switching element 2.

When the output current $I_{out}$ becomes even smaller than that in the first stand-by state, the first stand-by state goes to a second stand-by state. In the second stand-by state, a suspension period of the switching operation is longer than that in the first stand-by state. In other words, as the load becomes lighter, an intermittent control cycle is made longer. Here, the intermittent control cycle includes an executing period and a suspension period of the switching operation on the switching element 2. Hence, the intermittent oscillation control executed under the light load improves power efficiency under the light load.

The above conventional technique, however, causes the following problem: When the signal Enable goes high, the intermittent resuming circuit 91 outputs the signal Up in order to resume the switching operation in the intermittent oscillation control, regardless of the ringing voltage developed in the switching element 2. Thus, in the worst case, the switching element 2 can turn ON at the top; that is, the local maximum point of the ringing voltage. This problem leads to a power loss in the switching element 2.

For example, suppose C is the sum of a parasitic capacitance of the switching element 2 and a capacitance of a capacitor 31 connected in parallel between the input and the output of the switching element 2, and V is a voltage when the switching element 2 turns ON. Here, when the intermittent resumption occurs, the power loss occurring in the switching element 2 is obtained as follows:

[Math. 1]

$$\tfrac{1}{2}CV^2 \qquad\qquad\qquad\text{(Expression 1)}$$

The power loss is also referred to as a power loss by the capacitance C or a loss by the capacitance between the input and the output of the switching element.

In other words, the intermittent oscillation control under the light load is effective for the improvement in power efficiency under the light load. However, in the case where a voltage is high when the switching element 2 turns ON in the intermittent resumption, the capacitance C inevitably causes a large power loss as a result. In particular, when the intermittent control cycle is made shorter depending on the state of a load, the power loss becomes greater.

Patent Literatures 1 and 2, for example, disclose switching power supply devices to reduce a power loss which can be developed by the capacitance C in the intermittent resumption.

FIG. 18 depicts a functional block diagram exemplifying a structure of a conventional switching power supply device 910 which reduces a power loss that can occur in the intermittent resumption. The switching power supply device 910 is a modified version of the switching power supply device 900 in FIG. 16 based on an idea disclosed in Patent Literatures 1 and 2. In a control circuit 911, an intermittent resuming circuit 92 replaces the intermittent resuming circuit 91.

Described hereinafter is how the switching power supply device 910 operates in accordance with control techniques in Patent Literatures 1 and 2, with reference to timing diagrams in (a) and (b) in FIG. 19.

In the switching power supply device 910, the intermittent resuming circuit 92 times a predetermined waiting time period t (transformer reset detection time in Patent Literatures 1 and 2). Here, the time period t starts at an intermittent suspending signal (a falling edge of the signal Enable) as the starting point of the timing. The intermittent resuming circuit 92 outputs a low signal Mask in order to indicate that the intermittent resuming circuit 92 is timing the waiting time period t. Then, in the case where an intermittent resuming signal (the rising edge of the signal Enable) arrives before the intermittent resuming circuit 92 finishes timing the waiting time period t, a turn-on control circuit 94 outputs as a signal TurnOn a signal Bottom (the transformer reset signal in Patent Literatures 1 and 2) to be provided after the intermittent resumption, and turns ON the switching element 2 (the illustration (a) in FIG. 19).

In the case where an intermittent resuming signal (the rising edge of the signal Enable) does not arrive before the intermittent resuming circuit 92 finishes timing the waiting time period t, the intermittent resuming circuit 92 outputs, upon arriving the following intermittent resuming signal, a signal Up (the intermittent end pulse in Patent Literatures 1 and 2) which is a one-shot pulse. The turn-on control circuit 94 outputs the signal Up as a signal TurnOn in order to turn ON the switching element 2 (the illustration (b) in FIG. 19).

As a specific circuit to time the waiting time period t, Patent Literature 1 discloses a time constant circuit including a constant current source and a capacitor, and Patent Literature 2 discloses a counter circuit to count how many bottoms are observed in a ringing voltage.

Performing the above control, the switching power supply device 910 implements intermittent resumption at a bottom of the ringing voltage observed in the switching element, in the case where an intermittent resuming signal arrives within the waiting time when an intermittent suspending signal is designated as the starting point of the timing. Consequently, in the intermittent resumption, the switching power supply device 910 can reduce a loss caused by a capacitance between the input and the output of the switching element.

CITATION LIST

Patent Literature

[PTL 1]
  Japanese Patent No. 4033855
[PTL 2]
  Japanese Patent No. 4033850

SUMMARY OF INVENTION

Technical Problem

Devised based on the ideas disclosed in Patent Literatures 1 and 2, the switching power supply device 910 can encounter the problems below. Described hereinafter are the problems, with reference to (a) and (b) in FIG. 20.

As the waiting time period t, which elapses after the intermittent suspension signal is outputted, is made longer in the intermittent oscillation control, an output load range, which allows the switching element 2 to turn ON at a bottom of the ringing voltage in the intermittent resumption, is made wider. This contributes to reducing a loss in the intermittent resumption. As the waiting time period t is excessively long, however, the ringing of the voltage in the switching element 2 disappears as shown by a broken line circle A in the illustration (a) in FIG. 20. Consequently, no bottom is detected after the waiting time period t, and the switching power supply device 910 cannot implement the intermittent resumption.

In order to avoid the problem, the waiting time period t can be made shorter. Such a shorter waiting time period t, however, significantly narrows the output load range in which the switching element can turn ON at a bottom of the ringing voltage after the intermittent resumption. As a result, a broken line circle B in the illustration (b) in FIG. 20 shows another problem: In the intermittent resumption, the switching element 2 turns ON at a high voltage which is not a bottom. This problem decreases effectiveness of loss reduction made by the capacitance provided between the input and the output of the switching element 2. Taking into consideration specifications of a power supply, an operating environment, such as an ambient temperature, of the device, and variation in the parts, it is highly improbable to set an optimum setting time.

Exactly the same problems also develop with the structure disclosed in Patent Literature 2.

Specifically, as more ringing bottoms are counted in the intermittent oscillation control to determine the waiting time period t that elapses after the intermittent suspension signal is outputted, made wider is the output load range which allows the switching element 2 to turn ON at a bottom of the ringing voltage in the intermittent resumption. This contributes to reducing a loss in the intermittent resumption. In the case where too many bottoms are counted, however, the ringing of the voltage in the switching element 2 disappears as shown by the broken line circle A in the illustration (a) in FIG. 20. Consequently, no bottom is detected after the waiting time period t, and the switching power supply device 910 cannot implement the intermittent resumption. Furthermore, when many bottoms are to be counted, a larger layout area is required to install counters, which causes an increase in costs of semiconductor chips.

In order to solve the problem, fewer bottoms are to be counted. Counting fewer bottoms, however, significantly narrows the output load range in which the switching element can turn ON at a bottom of the ringing voltage after the intermittent resumption. As a result, the broken line circle B in the illustration (b) in FIG. 20 shows another problem: In the intermittent resumption, the switching element 2 turns ON at a high voltage which is not a bottom. This problem decreases effectiveness of loss reduction made by the capacitance between the input and the output of the switching element 2.

As described above, the ideas of Patent Literatures 1 and 2 have difficulties in optimally setting a time constant for a circuit and the number of bottoms to be counted to determine the waiting time period t for any power supply specifications. Thus such ideas are considered to be applicable only to a limited load range (an intermittent oscillation region).

The present invention is conceived in view of the above problems and has an object to provide a switching power supply device and a semiconductor device which are suitable for reducing a loss caused by a capacitance between the input and the output of a switching element in intermittent resumption. The switching power supply device carries out intermittent oscillation control and the intermittent resumption based on bottom detection, and the switching operation of the switching power supply device in continuous oscillation is applicable to the pulse width modulation (PWM) control, the pulse frequency modulation (PFM) control, and the secondary duty control, as well as to the quasi-resonant control used for a conventional switching power supply device.

Solution to Problem

In order to solve the above problems, a semiconductor device according to an aspect of the present invention controls a switching power supply that causes a switching element to intermittently execute a switching operation to supply and cut an input direct current (DC) voltage so as to convert the input DC voltage into a regulated output DC voltage. The semiconductor device includes: an intermittent oscillation control circuit which alternately gives an instruction for execution of the switching operation and an instruction for suspension of the switching operation; a bottom detecting circuit which detects, when the switching element is OFF, a bottom indicating a local minimum point of a ringing voltage that develops in the switching element; a bottom-monitoring time period timing circuit which times a bottom-monitoring time period for which the bottom of the ringing voltage is to be monitored, the bottom-monitoring time period starting as soon as the intermittent oscillation control circuit gives the instruction for the execution of the switching operation; and a turn-on control circuit which turns ON, while the bottom-monitoring time period is being timed, the switching element only when the bottom detecting circuit detects the bottom of the ringing voltage.

In the intermittent resumption, such a structure allows the bottom-monitoring time period to be timed as soon as the instruction is given to execute the switching operation, and causes the switching element to turn ON at a bottom of the ringing voltage detected while the bottom-monitoring time period is being timed. The feature successfully reduces the risk of a problem that the switching element turns ON at a high voltage and not at a bottom of the ringing voltage, compared with a conventional operation, that is to turn ON the switching element as soon as an instruction is given to execute the switching operation after the elapse of a waiting time period t to be timed as soon as an instruction is given to suspend the switching operation no matter whether or not the bottom of the ringing voltage is detected. As a result, the feature successfully reduces a loss in the intermittent resumption by the capacitance between the input and the output of the switching element.

The bottom-monitoring time period timing circuit may time, as the bottom-monitoring time period, a length of the ringing voltage for one cycle or longer.

Such a feature allows a bottom of the ringing voltage to be monitored for one cycle or longer of the ringing voltage. In the intermittent resumption, the switching element never fails to turn ON at the bottom of the ringing voltage of the switching element as long as the ringing of the switching element continues. As a result, the power loss is minimized.

The turn-on control circuit may turn ON the switching element when the timing of the bottom-monitoring time period ends, regardless of the bottom of the ringing voltage.

Such a feature forces the switching element to turn ON when an instruction is given for intermittent resumption, even though the ringing of the voltage of the switching element has disappeared. Consequently, the intermittent resumption is successfully made. Furthermore, the feature allows the ringing voltage to be timed as the bottom-monitoring time period for one cycle or longer. This operation contributes to preventing excessively early force-turn-on, and surely reducing a power loss.

The bottom-monitoring time period timing circuit may suspend the timing of the bottom-monitoring time period when a gate signal of the switching element is brought to an ON level during the timing of the bottom-monitoring time period.

Such a feature suspends the timing of the bottom-monitoring time period when the switching element turns ON. Consequently, the feature successfully prevents a problem: After a bottom of the ringing voltage is detected and the switching element turns ON, the timing of the bottom-monitoring time period finishes, which forces the switching element to turn ON again.

The bottom-monitoring time period timing circuit may include a constant current source and a capacitor, and time the bottom-monitoring time period based on a time constant to be determined by a current value of the constant current source and a capacitance value of the capacitor.

Such a feature is useful when the bottom-monitoring time period is timed by an analog time constant circuit including a constant current source and a capacitor.

The bottom-monitoring time period timing circuit may include a ringing cycle measuring circuit which measures a ringing cycle after the intermittent oscillation control circuit gives the instruction for the suspension of the switching operation, the ringing cycle being a time period between a first bottom and a second bottom of the ringing voltage. The bottom-monitoring time period timing circuit may time, as the bottom-monitoring time period, a time period corresponding to the measured ringing cycle.

Such a feature allows the ringing voltage, which is measured for one cycle or longer in the intermittent suspension, to be timed as a bottom-monitoring time period in the intermittent resumption observed immediately after the intermittent suspension. Consequently, the feature successfully minimizes a response time period in the intermittent resumption according to the state of a load.

The ringing cycle measuring circuit may include a constant current source and a capacitor, and (i) start charging the capacitor, using a current generated by the constant current source, when the bottom detecting circuit detects the first bottom and (ii) finish charging the capacitor when the bottom detecting circuit detects the second bottom.

Such a feature allows the measured ringing cycle to be held as a voltage value of the capacitor.

The bottom-monitoring time period timing circuit may (i) start discharging the capacitor, using a current generated by the constant current source, when the intermittent oscillation control circuit gives the instruction for the execution of the switching operation, and (ii) finish the timing of the bottom-monitoring time period when a voltage of the capacitor goes below a voltage observed when the ringing cycle measuring circuit starts the charging.

Such a feature makes it possible to time, as the bottom-monitoring time period, a time period corresponding to the measured ringing cycle based on the voltage value held in the capacitor.

After the intermittent oscillation control circuit gives the instruction for the execution of the switching operation, the bottom-monitoring time period timing circuit may initialize the capacitor to an initial voltage when a gate signal of the switching element is brought to an ON level, the initial voltage being observed when the ringing cycle measuring circuit starts the charging.

Such a feature suspends the timing of the bottom-monitoring time period when the switching element turns ON. Consequently, the feature successfully prevents a problem: After a bottom of the ringing voltage is detected and the switching element turns ON, the timing of the bottom-monitoring time period finishes, which forces the switching element to turn ON again.

The semiconductor device may further include: an oscillating circuit which executes an oscillation operation regardless of the bottom of the ringing voltage to give an instruction for when to turn ON or turn OFF the switching element. The oscillating circuit may (i) suspend the oscillation operation when the intermittent oscillation control circuit gives the instruction for the suspension of the switching operation, and, after the intermittent oscillation control circuit gives the instruction for the execution of the switching operation, (ii) resume the oscillation operation when a gate signal of the switching element is brought to an ON level.

Such a feature is applicable to a switching power source which caries out a constant switching operation through the PWM control, the PFM control, and the secondary duty control, using a clock signal generated by the oscillating circuit. The feature causes the oscillating circuit to stop while the intermittent oscillation control suspends the switching operation to reduce a driving loss of the clock. The feature also causes the switching element to turn ON at a bottom of the ringing voltage in the intermittent resumption to reduce a power loss.

The semiconductor device that includes the switching element may be provided on a single semiconductor substrate.

Such a feature allows a control circuit of the switching power supply device to be implemented with fewer parts.

Instead of being implemented as the semiconductor device, the present invention may be implemented as a switching power supply device including: the semiconductor device, a converter which converts an input AC voltage into an output AC voltage, the input AC voltage generated of the input DC voltage though the switching operation by the switching element; and a smoothing circuit which converts the output AC voltage into the output DC voltage.

Moreover, the present invention may be implemented as a control method for controlling the switching power supply device.

Advantageous Effects of Invention

When a switching element intermittently carries out a switching operation to supply and cut an input DC voltage to convert the input DC voltage to a regulated output DC voltage, the semiconductor device of the present invention (i) times a bottom-monitoring time period as soon as an instruction is given to execute the switching operation in the intermittent resumption for resuming the switching operation, and (ii) turns ON the switching element at a bottom of the ringing voltage detected while the bottom-monitoring time period is being timed.

This feature successfully reduces the risk of a conventional problem that the switching element turns ON at a high voltage and not at a bottom of the ringing voltage when the switching element turns ON as soon as an instruction is given to execute the switching operation after the elapse of a waiting time period to be timed as soon as an instruction is given to suspend the switching operation no matter whether or not the bottom of the ringing voltage is detected. As a result, the feature successfully reduces a loss in the intermittent resumption by the capacitance between the input and the output of the switching element.

DESCRIPTION OF EMBODIMENTS

Described hereinafter are semiconductor devices and switching power supply devices according to embodiments of the present invention, with reference to the drawings.

Embodiment 1

Described here is a switching power supply device according to Embodiment 1 of the present invention.

Figure 1:
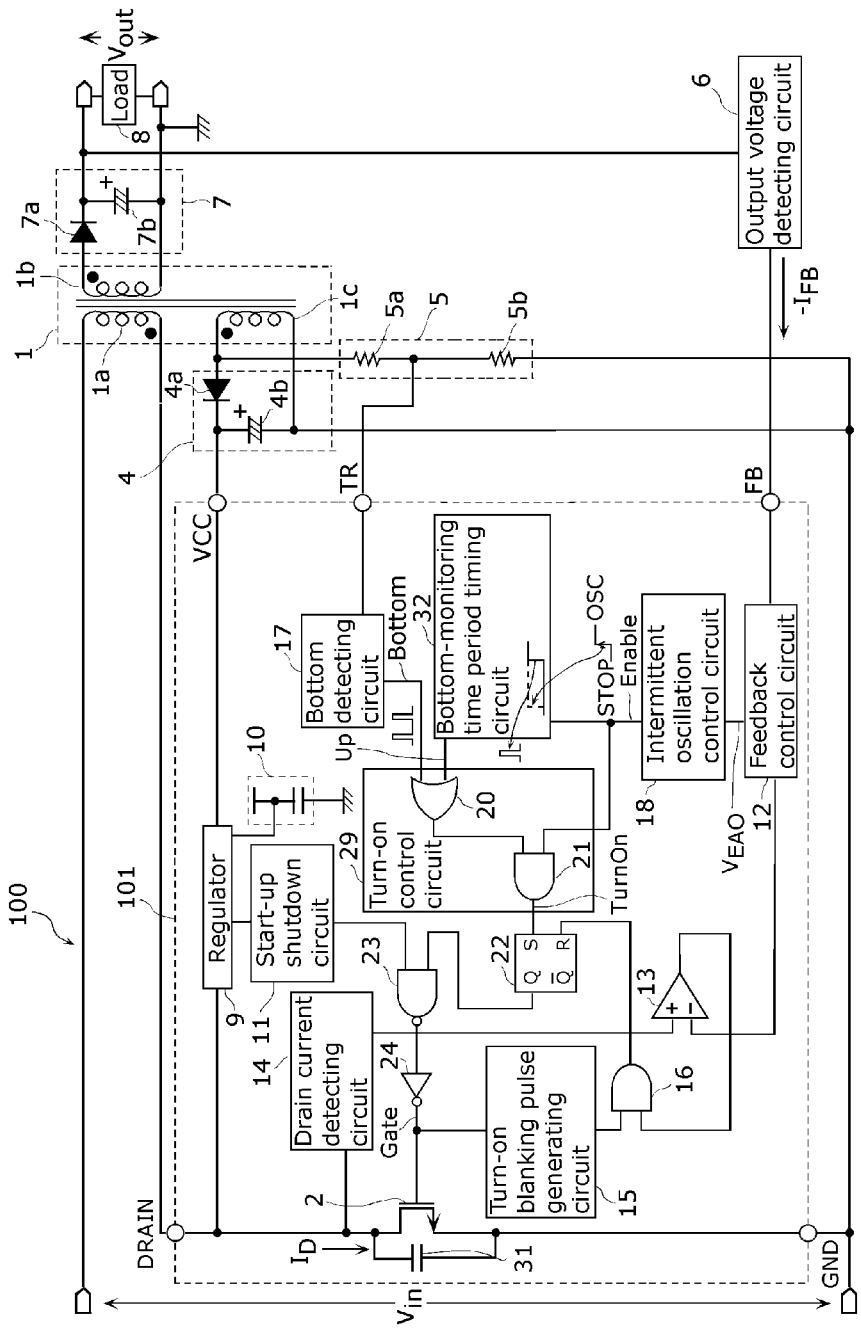
FIG. 1 depicts a functional block diagram exemplifying a structure of a switching power supply device including a semiconductor device according to Embodiment 1 of the present invention.

FIG. 1 depicts a circuit diagram exemplifying a structure of a switching power supply device 100 including a semiconductor device 101 according to Embodiment 1 of the present invention. The semiconductor device 101 works as a control circuit for the switching power supply device 100. Hereinafter, the control circuit implemented by the semiconductor device 101 is referred to as a control circuit 101 having the same numerical sign as the semiconductor device has In FIG. 1, a transformer 1 has a primary winding 1a, a secondary winding 1b, and an auxiliary winding 1c. Polarities between the primary winding 1a and the secondary winding 1b are reversed. An alternating current (AC) voltage obtained from the secondary winding 1b is converted into an output direct current (DC) voltage by an output voltage generating unit 7 including a rectifying diode 7a and a capacitor 7b. Then, the output DC voltage is supplied to a load 8. The switching power supply device 100 is a flyback power supply device.

The primary winding 1a is connected to the switching element 2. When a control electrode, or a gate, of the switching element 2 receives a signal Gate from a gate driver 24, the switching element 2 is turned ON and OFF.

The control circuit 101 includes the switching element 2. The switching element 2 is a power-MOSFET switching element, and may be integrated together with another part of the control circuit 101 on a single semiconductor substrate. The semiconductor device working as the control circuit 101 has five terminals as external input and output terminals: a DRAIN terminal, a GND terminal, a VCC terminal, an FB terminal, and a TR terminal.

The DRAIN terminal is connected to a connecting point between the primary winding 1a of the transformer 1 and the switching element 2. In other words, the DRAIN terminal is connected to the drain of the switching element 2.

The GND terminal connects the source of the switching element 2 and the GND of the control circuit 101 to the ground level. The GND terminal is connected to the low-potential side of an input DC voltage $V_{in}$.

The VCC terminal connects (i) an output of a rectifying and smoothing circuit 4, including a rectifying diode 4a and a capacitor 4b, with (ii) a regulator 9 incorporated into the control circuit 101. When the switching element 2 performs a switching operation to generate an AC voltage on the auxiliary winding 1c, and the rectifying and smoothing circuit 4 rectifies and smoothes the generated AC voltage to generate an auxiliary power source voltage, the auxiliary power source voltage is supplied through the VCC terminal to the control circuit 101.

The FB terminal is used for supplying a feedback signal (a current from a photo-transistor, for example), outputted from an output voltage detecting circuit 6, into a feedback control circuit 12 in the control circuit 101.

The TR terminal is used for detecting a ringing voltage which develops after the switching element 2 turns OFF and a secondary current stops flowing in the secondary winding 1b of the transformer 1. The TR terminal is also used for supplying an input voltage, to be used for detecting the ringing voltage, to the bottom detecting circuit 17 generating a pulse to turn ON the switching element 2. When the switching element 2 performs the switching operation to induce a voltage on the auxiliary winding 1c of the transformer 1, an auxiliary winding voltage-dividing circuit 5 which includes resistors 5a and 5b divides the induced voltage. The TR terminal receives the divided voltage.

The auxiliary winding voltage-dividing circuit 5 is provided for reducing the input voltage applied to the TR terminal, and for limiting a current to prevent latch-up in the control circuit 101 when a voltage on the auxiliary winding 1c goes negative by the resistor 5a.

It is noted that the signal Bottom, which is a pulse signal outputted from the bottom detecting circuit 17, is supplied as a signal TurnOn to a set input S of an RS flip-flop 22 through a turn-on control circuit 29. The signal TurnOn brings an output Q of the RS flip-flop 22 high. Thus, a high signal is applied to the first input of a NAND circuit 23.

The regulator 9 is connected between the DRAIN terminal and the VCC terminal both included in the switching element 2 and between a start-up shutdown circuit 11 and an internal circuit voltage source 10 both included in the control circuit 101. When the input DC voltage $V_{in}$ is applied to the DRAIN terminal through the transformer 1, the regulator 9 supplies a current from the DRAIN terminal through the VCC terminal to the capacitor 4b to raise an auxiliary power source voltage VCC. Here, the capacitor 4b is included in the rectifying and smoothing circuit 4 that outputs the auxiliary power source voltage VCC.

It is noted that when a VCC terminal reaches a start-up voltage, a current supply from the DRAIN terminal to the VCC terminal is cut. Thus, the current to the internal circuit is supplied by the capacitor 4b in the rectifying and smoothing circuit 4 which outputs the auxiliary power supply voltage VCC. In addition, when the VCC terminal voltage decreases to the shut-down voltage, the current is supplied from the DRAIN terminal to the VCC terminal as observed before the start up, and then the VCC terminal voltage increases again. The internal circuit voltage source 10 is controlled by the regulator 9 so that the voltage of the internal circuit voltage source 10 is constant.

The start-up shutdown circuit 11 monitors a voltage to be applied to the VCC terminal, and controls oscillation and suspension of the switching element 2 depending on the amount of voltage applied to the VCC terminal. When the voltage of the VCC terminal increases to a start-up voltage, the start-up shutdown circuit 11 applies a high signal to the second input of the NAND circuit 23. When the voltage of the VCC terminal decreases to the shut-down voltage, the start-up shutdown circuit 11 applies a low signal to the second input of the NAND circuit 23.

The feedback control circuit 12 determines the level of a current flowing in the switching element 2 so that an output DC voltage $V_{out}$ is maintained constant, depending on a feedback signal (a current $I_{FB}$ flowing from the FB terminal to the output voltage detecting circuit 6, for example) which is outputted from the output voltage detecting circuit 6 and inputted via the FB terminal. Then, the feedback control circuit 12 applies a voltage $V_{EAO}$, which represents the determined limitation level, to the negative input of a comparator 13.

It is noted that the output voltage VEAO is used to control the current flowing in the switching element 2 to (i) decrease when the load is light and the output DC voltage $V_{out}$ increases, and (ii) increase when the load is heavy and the output DC voltage $V_{out}$ decreases.

Figure 2:
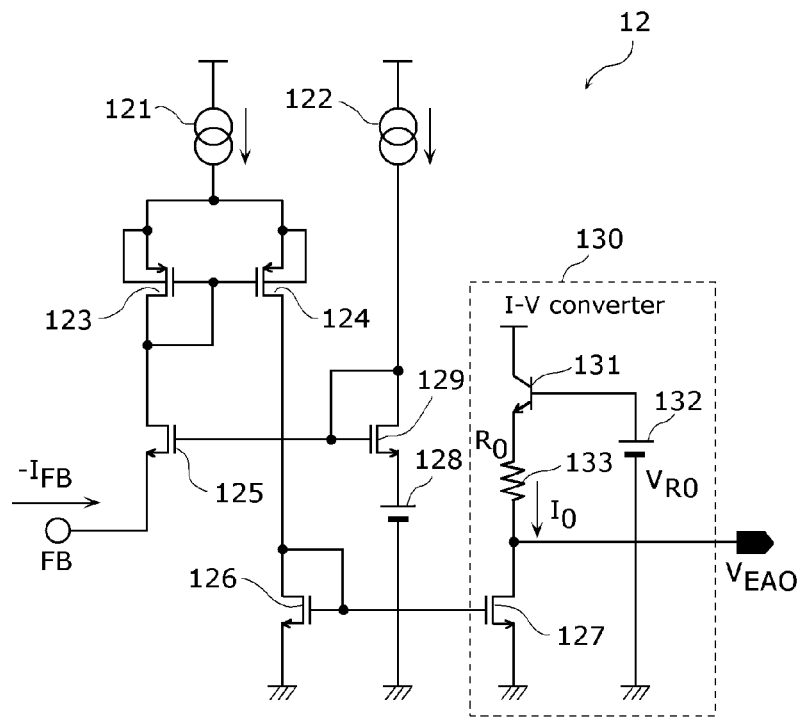
FIG. 2 depicts a circuit diagram exemplifying a structure of a feedback control circuit included in the semiconductor device according to Embodiment 1.

FIG. 2 depicts a circuit diagram exemplifying a specific circuit structure of the feedback control circuit 12.

The feedback control circuit 12 includes constant current sources 121 and 122, p-type MOSFETs 123 and 124, n-type MOSFETs 125, 126, 127, and 129, constant voltage sources 128 and 132, a resistor 133, and an NPN bipolar transistor 131.

The n-type MOSFET 127, the resistor 133, the NPN bipolar transistor 131, and the constant voltage source 132 form an I-V converter 130. Each pair of the p-type MOSFETs 123 and 124, and the n-type MOSFETs 126 and 127 forms a current mirror circuit.

It is noted that the constant current sources 121 and 122 are used for limiting the current when the FB terminal short-circuits with the GND. The current $I_{FB}$, flowing from the FB terminal, is voltage-converted to the voltage $V_{EAO}$ by the I-V converter. Here, the voltage $V_{EAO}$ is determined by the current flowing in the resistor 32 and varies as Expression 2 shows:

[Math. 2]

$$V_{EAO}=V_{R0}-V_{be}-R_0 \times I_0 \quad \text{(Expression 2)}$$

Here, the following relationships hold:

$V_{EAO}$: an output voltage of the I-V converter 130;
$V_{RO}$: a constant voltage value of the constant voltage source 132;
$V_{be}$: a voltage between B and E of the NPN bipolar transistor 131;
$R_0$: a resistor value of the resistor 133; and
$I_0$: a current flowing in the resistor 133.

Expression 2 shows that as the current $I_0$ flowing in the resistor 133 is greater, the converted voltage $V_{EAO}$ decreases further. In other words, as the current $I_{FB}$ flowing from the FB terminal is greater, the $V_{EAO}$ decreases further. The decreasing $V_{EAO}$ causes the current in the switching element 2 to decrease. As the $I_{FB}$ flowing out of the FB terminal becomes smaller, the $V_{EAO}$ increases further. The increasing $V_{EAO}$ causes the current in the switching element 2 to increase.

Hence, it is the feedback signal provided from the output voltage detecting circuit 6, or the current IFB flowing at the FB terminal, that controls the current flowing in the switching element 2 as described above.

Figure 3:
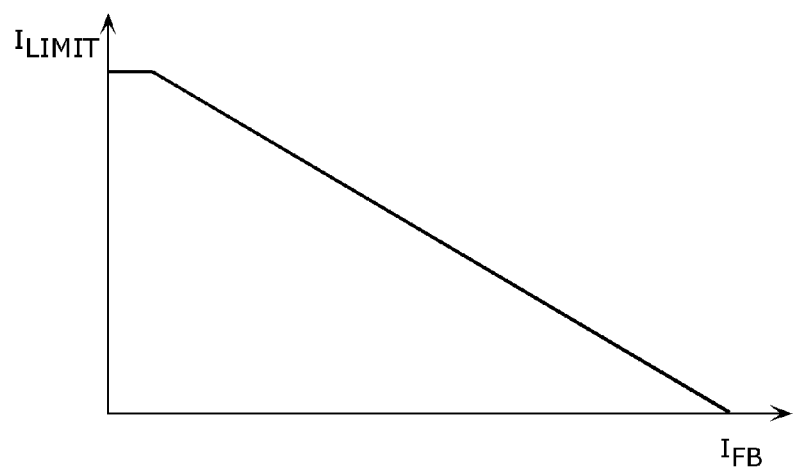
FIG. 3 graphically shows a feedback current versus a current flowing in a switching element in the switching power supply device including the semiconductor device according to Embodiment 1.

FIG. 3 graphically shows a current flowing in the resistor 133; that is, the relationship between the FB-terminal current $I_{FB}$ and a limitation level $I_{LIMIT}$ of the drain current flowing in the switching element 2. Further explanation continues with reference to FIGS. 1 and 3.

For example, a drain current detecting circuit 14, working as a current detecting circuit for the switching element 2, detects an ON voltage to be obtained by the product of the drain current flowing in the switching element 2 and an ON resistance of the switching element 2 in order to detect the drain current flowing in the switching element 2. Then, the drain current detecting circuit 14 applies to the positive input of the comparator 13 a voltage signal proportional to the magnitude of the drain current. When an output signal from the drain current detecting circuit 14 becomes equal to the output voltage $V_{EAO}$ of the feedback control circuit 12, the comparator 13 outputs a high signal to the first input of an AND circuit 16.

After the signal Gate outputted from the gate driver 24 goes high to turn ON the switching element 2, a turn-on blanking pulse generating circuit 15 outputs, during a certain blanking period, a low blanking signal to the second input of the AND circuit 16. This prevents the switching element 2 from being accidentally turned OFF due to false detection of a capacitive spike current caused by the capacity of the switching element 2 itself. After the blanking period, a high blanking signal is outputted from the turn-on blanking pulse generating circuit 15 to the second input of the AND circuit 16.

In the case where (i) a blanking period, set by the turn-on blanking pulse generating circuit 15 when the switching element 2 turns ON, has elapsed, and (ii) a current, having the limitation level $I_{LIMIT}$ determined by the feedback control circuit 12, flows in the switching element 2, both of the input signals in the AND circuit 16 are high. Thus, the output signal from the AND circuit 16 is high.

Figure 4:
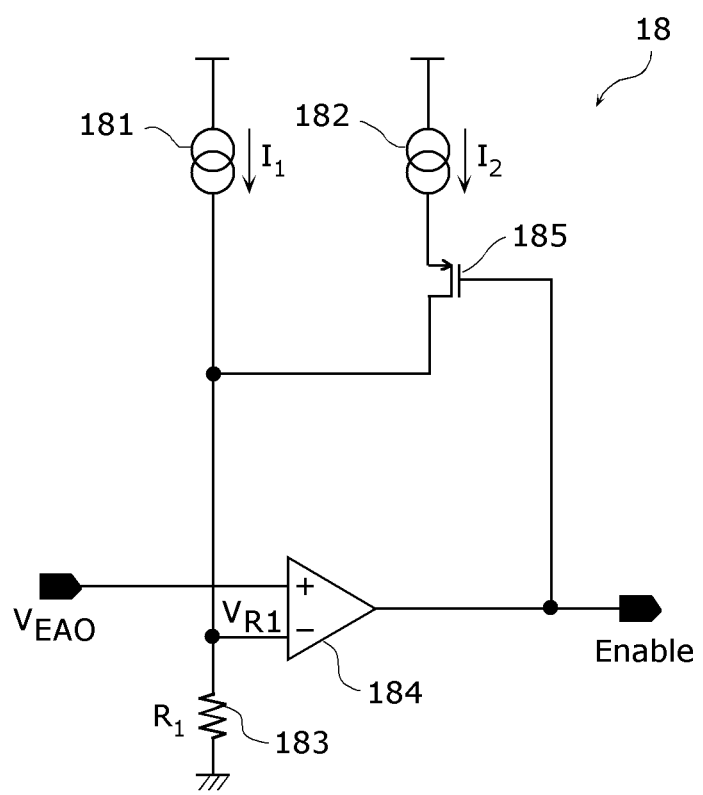
FIG. 4 depicts a circuit diagram exemplifying a structure of an intermittent oscillation control circuit included in the semiconductor device according to Embodiment 1.

FIG. 4 depicts a circuit diagram exemplifying a specific circuit structure of the intermittent oscillation control circuit 18.

The intermittent oscillation control circuit 18 includes constant current sources 181 and 182, a resistor 183, a comparator 184, and a p-type MOSFET 185. The constant current sources 181 and 182 respectively output constant currents $I_1$ and $I_2$. The resistor 183 has the resistor value of $R_1$.

The intermittent oscillation control circuit 18 compares the output voltage $V_{EAO}$ provided from the feedback control circuit 12 with a reference voltage $V_{R1}$ of the comparator 184, and outputs a signal Enable indicating the comparison result. The reference voltage $V_{R1}$ of the comparator 184 has the hysteresis below. If $V_{EAO}$ is higher than $V_{R1}$, the signal Enable is high. Thus, the p-type MOSFET 185 is OFF, and the reference voltage $V_{R1}$ is obtained as follows:

[Math. 3]

$$V_{R1}=R_1 \times I_1 \quad \text{(Expression 3)}$$

If $V_{EAO}$ is lower than $V_{R1}$, the signal Enable low. Thus, the p-type MOSFET 185 is ON, and the reference voltage $V_{R1}$ is obtained as follows:

[Math. 4]

$$V_{R1}=R_1 \times (I_1+I_2) \quad \text{(Expression 4)}$$

According to the above hysteresis, the intermittent oscillation control circuit 18 outputs the signal Enables: If $V_{EAO}$ is high, that is an output load is heavy, the intermittent oscillation control circuit 18 outputs the high signal Enable indicating that a switching operation is ready; and if $V_{EAO}$ is low, that is an output load is light, the intermittent oscillation control circuit 18 outputs the low signal Enable indicating that the switching operation is suspended.

Further explanation continues with reference to FIG. 1.

The intermittent oscillation control circuit 18 applies the signal Enable to the second input of an AND circuit 21 and to a bottom-monitoring time period timing circuit 32. The bottom-monitoring time period timing circuit 32 times a bottom-monitoring time period t which starts as soon as the rise of the signal Enable is observed. When finishing the timing of the bottom-monitoring time period t, the bottom-monitoring time period timing circuit 32 applies the signal Up, which is a pulse signal, to an OR circuit 20. The OR circuit 20 applies a high signal to the first input of the AND circuit 21 in the case where at least one of the signal Bottom and the signal Up is high.

A specific circuit structure of the bottom-monitoring time period timing circuit 32 shall be detailed later in how the switching power supply device 100 operates.

Figure 5:
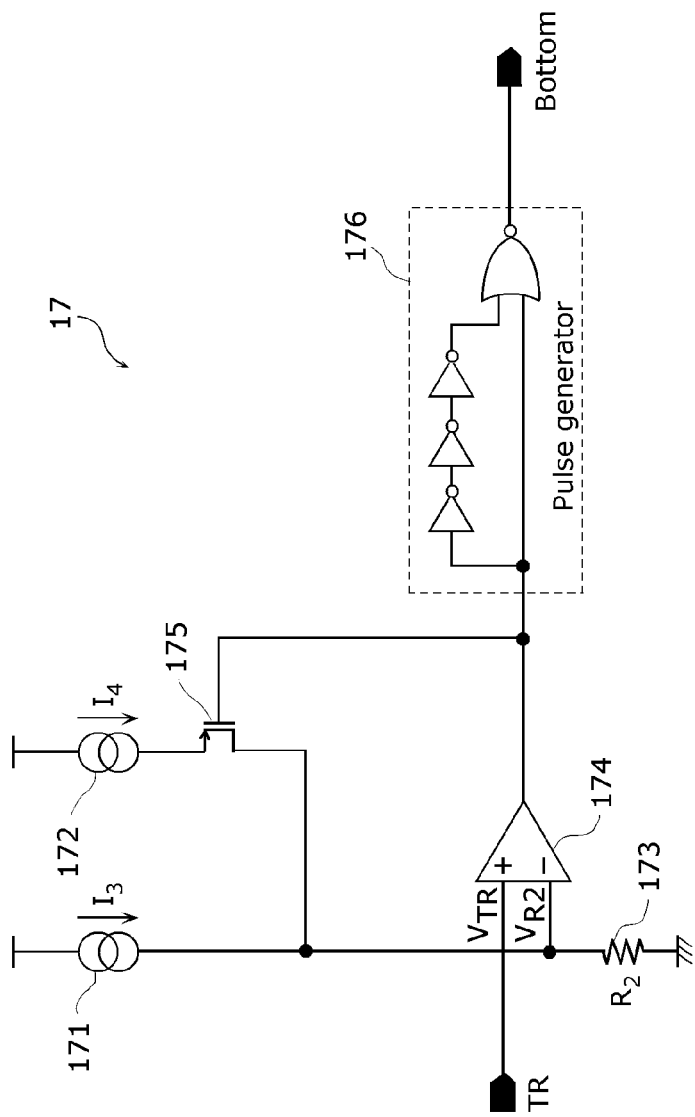
FIG. 5 depicts a circuit diagram exemplifying a structure of a bottom detecting circuit included in the semiconductor device according to Embodiment 1.

FIG. 5 depicts a circuit diagram exemplifying a specific circuit structure of the bottom detecting circuit 17.

The bottom detecting circuit 17 includes constant current sources 171 and 172, a resistor 173, a comparator 174, a p-type MOSFET 175, and a pulse generator 176. Typically formed of three inverter circuits and a NOR circuit, the pulse generator 176 outputs a one-shot pulse at a falling edge of an input signal. The constant current sources 171 and 172 respectively output constant currents $I_3$ and $I_4$. The resistor 173 has the resistor value of $R_2$.

The TR terminal of the bottom detecting circuit 17 receives a voltage $V_{TR}$. To obtain the voltage $V_{TR}$, the switching element 2 performs the switching operation to induce a voltage on the auxiliary winding 1c included in the transformer 1, and the auxiliary winding voltage-dividing circuit 5 which includes the resistors 5a and 5b divides the induced voltage. The voltage $V_{TR}$ is compared with a reference voltage $V_{R2}$ of the comparator 174.

The reference voltage $V_{R2}$ of the comparator 174 has the hysteresis below. If $V_{TR}$ is higher than $V_{R2}$ where $V_{TR}$ is a voltage of the TR terminal, the output signal of the comparator 174 is high. Thus, the signal Bottom outputted from the pulse generator 176 is low. Here, the p-type MOSFET 175 is OFF, and the reference voltage $V_{R2}$ is obtained as follows:

[Math. 5]

$$V_{R2}=R_2\times I_3 \quad \text{(Expression 5)}$$

If $V_{TR}$ is lower than $V_{R2}$, the output signal from the comparator 174 goes from high to low. The pulse generator 176 outputs the signal Bottom, which is a one-shot pulse, at a falling edge of the output signal from the comparator 174. In other words, if the voltage $V_{TR}$ of the TR terminal goes lower than the reference voltage $V_{R2}$, the signal Bottom is outputted as a one-shot pulse signal. Here, the p-type MOSFET 175 is ON, and the reference voltage $V_{R2}$ changes as follows:

[Math. 6]

$$V_{R2}=R_2\times(I_3+I_4) \quad \text{(Expression 6)}$$

When the switching power supply device 100 completes its start up, the start-up shutdown circuit 11 applies the high signal to the first input of the NAND circuit 23. Actually, a start-up pulse is outputted here; however, the details thereof shall be omitted. It is noted that the switching power supply device 100 is overloaded at the start-up. Thus, the intermittent oscillation control circuit 18 applies the high signal to the second input of the AND circuit 21.

In the subsequent operation, the bottom detecting circuit 17 applies the high signal TurnOn to the set input S of the RS flip-flop 22 via the OR circuit 20 and the AND circuit 21. The output Q of the RS flip-flop 22 goes high, and the high signal is also applied to the first input of the NAND circuit 23. Here, the output signal from the NAND circuit 23 is brought low. Thus the output signal from the gate driver 24 is brought high, which turns ON the switching element 2.

When the switching element 2 turns ON, and, after the turn-on blanking period, a current for a feedback signal is sent from the output voltage detecting circuit 6 by the feedback control circuit 12, the high signal from the AND circuit 16 is applied to the reset input R of the RS flip-flop 22.

Thus, the output Q of the RS flip-flop 22 goes low, and the first input of the NAND circuit 23 goes low. Consequently, the output signal of the gate driver 24 is brought low, and the switching element 2 turns OFF.

Through the above signal processing, the switching element 2 carries out the switching operation.

It is noted that the secondary winding 1b included in the transformer 1 connects to the output voltage generating unit 7 including the rectifying diode 7a and the capacitor 7b. The switching element 2 carries out the switching operation to induce an AC voltage on the secondary winding 1b, and the output voltage generating unit 7 rectifies and smoothes the induced AC voltage to generate the output DC voltage $V_{out}$. Then, the output DC voltage $V_{out}$ is supplied to the load 8.

Including a light-emitting diode (LED) and a zener diode, for example, the output voltage detecting circuit 6 detects a voltage level of the output DC voltage $V_{out}$, and outputs a feedback signal which is necessary for the control circuit 101 to control the switching operation on the switching element 2 so that the output DC voltage $V_{out}$ is maintained at a predetermined voltage.

In the switching power supply device 100, commercially-available AC power is rectified by a rectifier, such as a diode bridge, smoothed by an input capacitor, and transformed into the DC voltage $V_{in}$. Then, the DC voltage $V_{in}$ is provided to the primary winding 1a of the transformer 1 used for power conversion.

Described below are operations of the control circuit 101 and the switching power supply device 100 shown in FIG. 1.

AC power provided by a commercially-available power supply is rectified by a rectifier such as a diode bridge, smoothed by an input capacitor, and transformed to the DC voltage $V_{in}$. The DC input voltage $V_{in}$ is applied to the DRAIN terminal via the primary winding 1a of the transformer 1. Then, from the DRAIN terminal, a charge current for start up flows to the capacitor 4b connected to the VCC terminal through the regulator 9 included in the control circuit 101. When the charge current causes the VCC terminal voltage of the control circuit 101 to reach a start-up voltage set by the start-up shutdown circuit 11, the switching element 2 starts the control of the switching operation.

Omitted in FIG. 1 is that while the switching power supply device 100 is starting up, a start-up pulse is generated according to the output signal from the start-up shutdown circuit 11, and the switching element 2 turns ON. Here, the secondary-side output voltage $V_{out}$ is low during the start up, and thus the feedback signal provided from the output voltage detecting circuit 6 is not applied to the feedback control circuit 12. Hence, the conversion voltage $V_{EAO}$ of the I-V converter 130 in the feedback control circuit 12 is high, and the voltage on the negative input of the comparator 13 is set high.

Once the switching element 2 turns ON, a current flows in the switching element 2. Then a voltage is applied to the positive input of the comparator 13, depending on the magnitude of the flowing current. When the blanking time period set by the turn-on blanking pulse generating circuit 15 is over and the output signal from the drain current detecting circuit 14 rises as high as or higher than the voltage to be applied to the negative input of the comparator 13, both the two inputs of the AND circuit 16 receive high signals. Then, the AND circuit 16 outputs a high signal to the reset input R of the RS flip-flop 22, and the switching element 2 turns OFF.

After the switching element 2 turns OFF, provided to the secondary winding 1b is energy stored on the primary winding 1a of the transformer 1 when the switching element 2 turned ON. Then, when the secondary current stops flowing in the secondary winding 1b, ringing starts. The ringing is oscillation determined by inductance L developed by the primary winding 1a of the transformer 1 and a capacitance value of a capacitor 31 used for oscillating and connected between the DRAIN terminal and the source terminal of the switching element 2.

Here, when the voltage for the auxiliary winding 1c of the transformer 1 switches from positive to negative, the bottom detecting circuit 17 detects a drop of the drain voltage of the switching element 2; that is, a bottom of the ringing voltage. Thus, the signal TurnOn is applied to the set input S of the RS flip-flop 22. Then, the switching element 2 turns ON again.

Preferably, a not-shown phase shift capacitor may be connected to the TR terminal to regulate the timing of the signal Bottom to be outputted by the bottom detecting circuit 17, and to turn ON the switching element 2 when the voltage on the DRAIN of the switching element 2 drops to approximately zero.

The above switching operation raises the output voltage $V_{out}$. When the output voltage $V_{out}$ goes as high as or higher than the voltage set by the output voltage detecting circuit 6, the output voltage detecting circuit 6 lets, as a feedback signal, the current $I_{FB}$ flow out of the FB terminal of the control circuit 101. In accordance with the magnitude of the current $I_{FB}$, the output voltage $V_{EAO}$, which is converted by the I-V converter included in the feedback control circuit 12, decreases, and the voltage on the negative input of the comparator 13 decreases. Consequently, the switching element 2 flowing in the switching element 2 reduces.

Hence, the on-duty of the switching element 2 changes to an appropriate state. In other words, the switching element 2 (i) turns ON by the signal Bottom from the bottom detecting circuit 17 and (i) turns OFF when a current flowing in the switching element 2 reaches a current level to be determined based on the amount of the current flowing out of the FB terminal.

Specifically, when a load is light and thus the amount of the current supplied to the load 8 is small, a current-flowing period in the switching element 2 becomes short. When a load is heavy, a current-flowing period in the switching element 2 becomes long.

Hence, according to the power supplied to the load 8 included in the switching power supply device 100, the control circuit 101 controls the current flowing in the switching element 2 to change the on-duty.

When the load is light and thus the amount of the current supplied to the load 8 is small, the output voltage $V_{EAO}$ of the I-V converter 130 included in the feedback control circuit 12 decreases below the reference voltage $V_{R1}$ of the comparator 184 included in the intermittent oscillation control circuit 18.

Here, the signal Enable goes from high to low. The high signal Enable and the low signal Enable indicate execution and suspension of the switching operation, respectively.

Described here in detail is a structure of the bottom-monitoring time period timing circuit 32.

Figure 6:
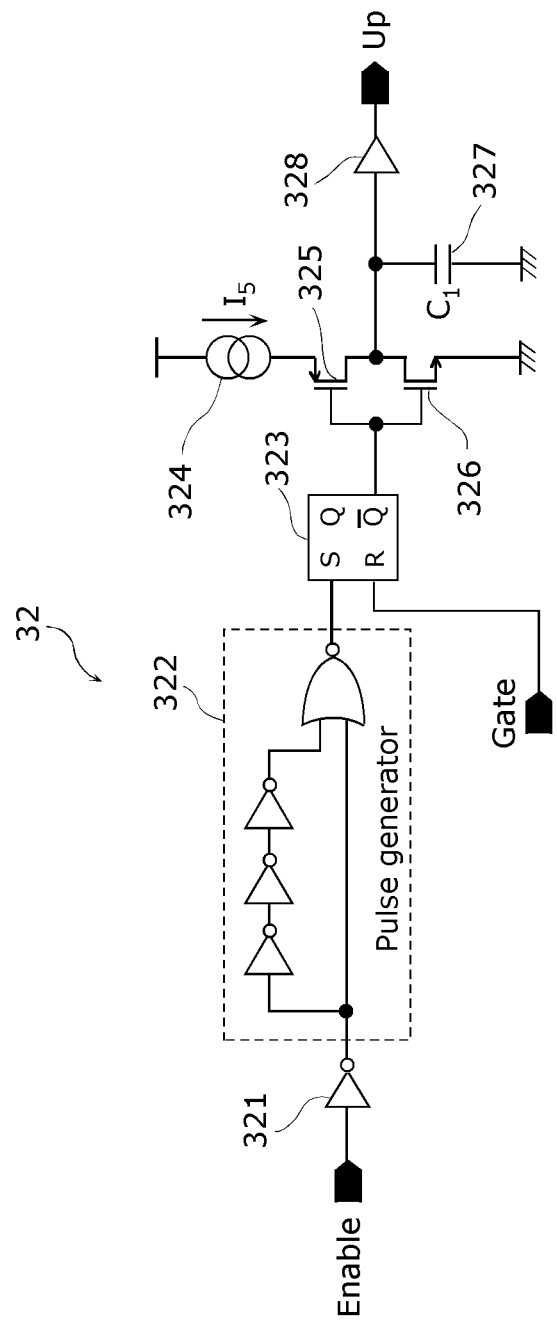
FIG. 6 depicts a circuit diagram exemplifying a structure of a bottom-monitoring time period timing circuit included in the semiconductor device according to Embodiment 1.

FIG. 6 depicts a circuit diagram exemplifying a structure of the bottom-monitoring time period timing circuit 32.

The bottom-monitoring time period timing circuit 32 includes an inverter circuit 321, a pulse generator 322, an RS flip-flop 323, a constant current supply 324, a p-type MOSFET 325, an n-type MOSFET 326, a capacitor 327, and a buffer circuit 328. The constant current supply 324 outputs a constant current $I_5$. The capacitor 327 has the capacitance value of $C_1$.

During execution of the switching operation, the signal Gate is periodically applied to the reset input of the RS flip-flop 323 and the output $\neg Q$ of the RS flip-flop 323 is maintained high. Here, the n-type MOSFET 326 is brought ON to start discharging the capacitor 327. Then, the low signal Up is outputted from the buffer circuit 328.

When the signal Enable to be applied to the bottom-monitoring time period timing circuit 32 is brought low, that is when an intermittent suspension signal comes, the output of the inverter circuit 321 is brought high. Here, the set input of the RS flip-flop 323 remains low. Thus, the capacitor 327 does not start discharging and the signal Up remains low.

When the signal Enable applied to the bottom-monitoring time period timing circuit 32 is brought high, that is when an intermittent resuming signal comes, the output of the inverter circuit 321 goes low. At a falling edge of the output signal from the inverter circuit 321, the pulse generator 322 applies a one-shot pulse to the set input of the RS flip-flop 323. Thus, the output $\neg Q$ of the RS flip-flop 323 goes low.

Hence, the p-type MOSFET 325 is brought ON, and the constant current supply 324 accumulates charges in the capacitor 327. Thus, the voltage at the high-side of the capacitor 327 rises at a speed in accordance with a time constant to be determined by the current value of the constant current supply 324 and the capacitance value of the capacitor 327. Then, when the voltage at the high-side of the capacitor 327 rises to a threshold level of the buffer circuit 328, the signal Up to be outputted from the bottom-monitoring time period timing circuit 32 is brought high.

Here, the time period between the arrival of the intermittent resuming signal and the change of the signal Up to go high corresponds to a bottom-monitoring time period. In other words, the bottom-monitoring time period timing circuit 32 times the bottom-monitoring time period based on a time constant to be determined by the current value of the constant current supply 324 and the capacitance value of the capacitor 327.

It is noted that the signal Gate from the switching element 2 is applied to the reset input R of the RS flip-flop 323. Thus, when the switching operation resumes while the bottom-monitoring time period is being timed, the signal Gate resets the RS flip-flop 323, and the n-type MOSFET 326 is brought ON to instantly discharge the charges of the capacitor 327. Consequently, the timing of the bottom-monitoring time period is suspended. Here, the signal Up outputted from the bottom-monitoring time period timing circuit 32 is maintained low and remains unchanged.

Expression 7 shows how to obtain the bottom-monitoring time period t between the change of the signal Enable to go high and the change of the signal Up to go high.

[Math. 7]

$$t = (C_1 \times V_{th})/I_5 \qquad \text{(Expression 7)}$$

Here, the following relationships hold:

$C_1$: a capacitance value of the capacitor 327;

$V_{th}$: a threshold value of the buffer circuit 328; and $I_5$: a current value flowing in the constant current supply 324.

Described hereinafter is an operation of the bottom-monitoring time period timing circuit 32 with reference to the timing diagrams (a) and (b) in FIG. 7.

Figure 7:
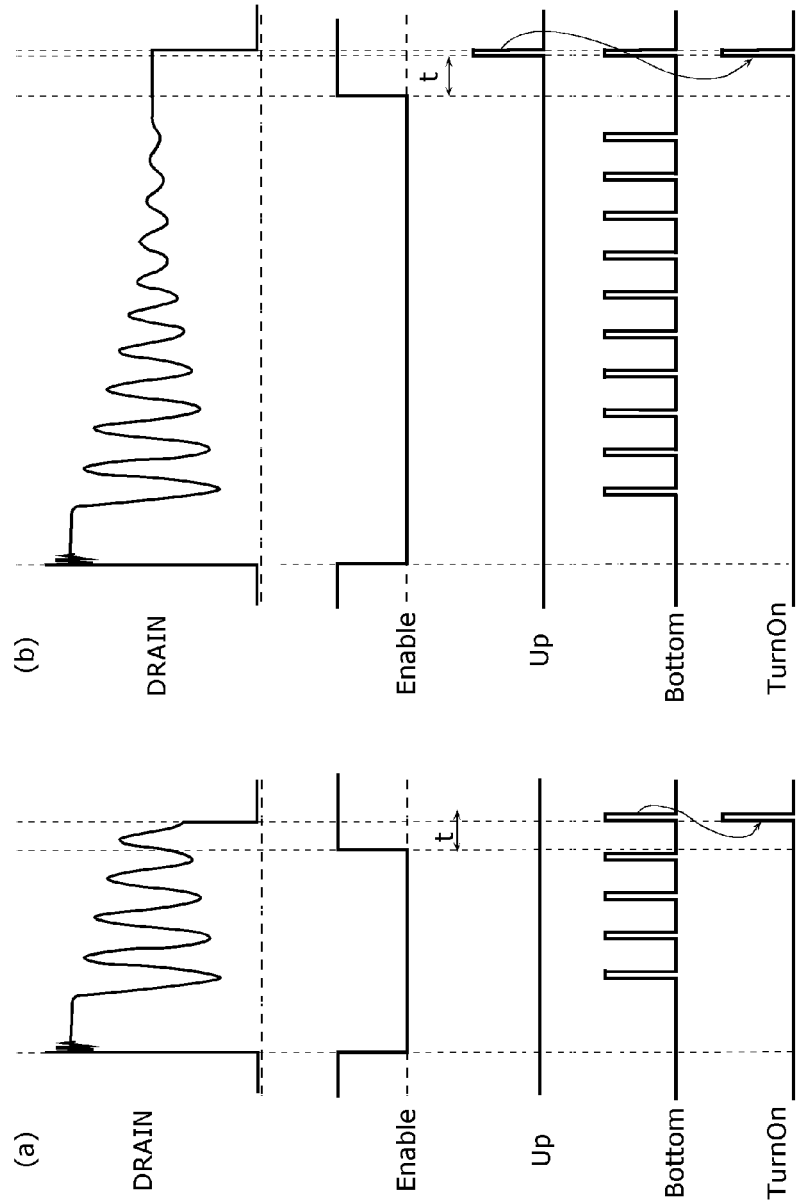
FIG. 7 depicts timing diagrams (a) and (b) exemplifying an operation of the switching power supply device including the semiconductor device according to Embodiment 1.

The timing diagrams (a) and (b) in FIG. 7 show waveforms of a drain voltage DRAIN, a signal Enable, a signal Up, a signal Bottom, and a signal TurnOn in the switching element 2. The timing diagram (a) shows the case where the signal Bottom arrives between the rise of the signal Enable and the end of the bottom-monitoring time period t. The timing diagram (b) shows the case where the bottom signal does not arrive between the rise of the signal Enable and end of the bottom-monitoring time period t.

When the load becomes heavy after the suspension of the intermittent oscillation and the signal Enable switches goes from low to high, the bottom-monitoring time period timing circuit 32 starts timing the bottom-monitoring time period t as represented in Expression 7.

Suppose the case of the timing diagram (a), that is, the case where the signal Bottom is outputted from the bottom detecting circuit 17 before the timing of the bottom-monitoring time period t represented by Expression 7 ends. Here, the signal Bottom from the bottom detecting circuit 17 is applied to the OR circuit 20 in FIG. 1. Hence the signal TurnOn is applied to the set input S of the RS flip-flop 22 via the AND circuit 21, and the switching element 2 turns ON.

In the intermittent resumption, when the signal Bottom arrives between the arrival of the intermittent resuming signal and the end of the bottom-monitoring time period t, the switching element 2 turns ON at a bottom of the ringing voltage. Here, the signal Up outputted from the bottom-monitoring time period timing circuit 32 is maintained low and does not go high.

Furthermore, suppose the case of the timing diagram (b), that is the case where the signal Bottom is not outputted from the bottom detecting circuit 17 between the rise of the signal Enable and end of the bottom-monitoring time period t expressed in Expression 7. Here, the bottom-monitoring time period timing circuit 32 brings the signal Up high when the bottom-monitoring time period t elapses. The signal Up, outputted from the bottom-monitoring time period timing circuit 32, is applied to the OR circuit 20 in FIG. 1. Then the signal TurnOn is applied to the set input S of the RS flip-flop 22 via the AND circuit 21, and the switching element 2 turns ON. Here, the signal Gate resets the RS flip-flop 323, and the n-type MOSFET 326 is brought ON to instantly discharge the charges of the capacitor 327. Consequently, the signal Up goes low.

In the intermittent resumption, when the signal Bottom does not arrive between the arrival of the intermittent resuming signal and the end of the bottom-monitoring time period t, the bottom-monitoring time period timing circuit 32 brings the signal Up high when the bottom-monitoring time period t elapses. Consequently, the switching element 2 is forced to turn ON.

In Embodiment 1, as described above, suppose the case where the bottom detecting circuit 17 detects a bottom of the ringing voltage in the switching element 2 within the bottom-monitoring time period t which the bottom-monitoring time period timing circuit 32 times. Here, the bottom-monitoring time period t as soon as the signal Enable changes from low to high. In such a case, the switching element 2 turns ON when the bottom is detected. Suppose the case where a bottom is not detected on the ringing voltage in the switching element 2 within the bottom-monitoring time period t that the bottom-monitoring time period timing circuit 32 times. In such a case, the switching element 2 is forced to turn ON when the bottom-monitoring time period timing circuit 32 finishes timing the bottom-monitoring time period t.

It is noted that the bottom-monitoring time period timing circuit 32 preferably times a bottom-monitoring time period t for one cycle or longer for the ringing of the switching element 2. Suppose the bottom-monitoring time period t for the ringing of the switching element 2 is set for one cycle or longer. In the intermittent resumption, when the signal Enable from the intermittent oscillation control circuit 18 goes from low to high, and then the bottom detecting circuit 17 detects a bottom of the ringing voltage during a one-cycle in the ringing of the switching element 2, the switching element 2 never fails to turn ON by the signal Bottom applied from the bottom detecting circuit 17. In other words, the switching element 2 is not forced to turn ON excessively early. As far as the ringing of the switching element 2 continues when the intermittent resuming signal arrives, the switching element 2 never fails to turn ON at the bottom of the ringing voltage.

Such control contributes to reducing, to the least, a loss caused by a capacitance between the input and the output of the switching element 2.

It is noted that a terminal is added to the control circuit 101 so that a capacitor may be externally added for timing the bottom-monitoring time period t to increase a regulating range for the bottom-monitoring time period t.

Suppose the case where a bottom on the ringing voltage of the switching element 2 is not detected by the bottom detecting circuit 17 during a one-cycle ringing. Such a case means that the ringing of the switching element 2 has already disappeared. Here, after timing the bottom-monitoring time period t, the bottom-monitoring time period timing circuit 32 outputs the signal Up to turn ON the switching element 2. Then, the switching operation resumes. It is noted that in the case where the ringing of the switching element 2 has already disappeared, the voltage of the switching element 2 equals to the input voltage $V_{in}$. Thus, the switching element 2 turns ON with the input voltage $V_{in}$. However, the ringing on the voltage of the switching element 2 disappears when an intermittent suspension period is significantly long (in other words, the intermittent resumption occurs very few times). Consequently, a capacitance loss caused by the switching of the switching element 2 is negligibly small as a percentage of losses.

Embodiment 2

Described next is a switching power supply device according to Embodiment 2 of the present invention.

Figure 8:
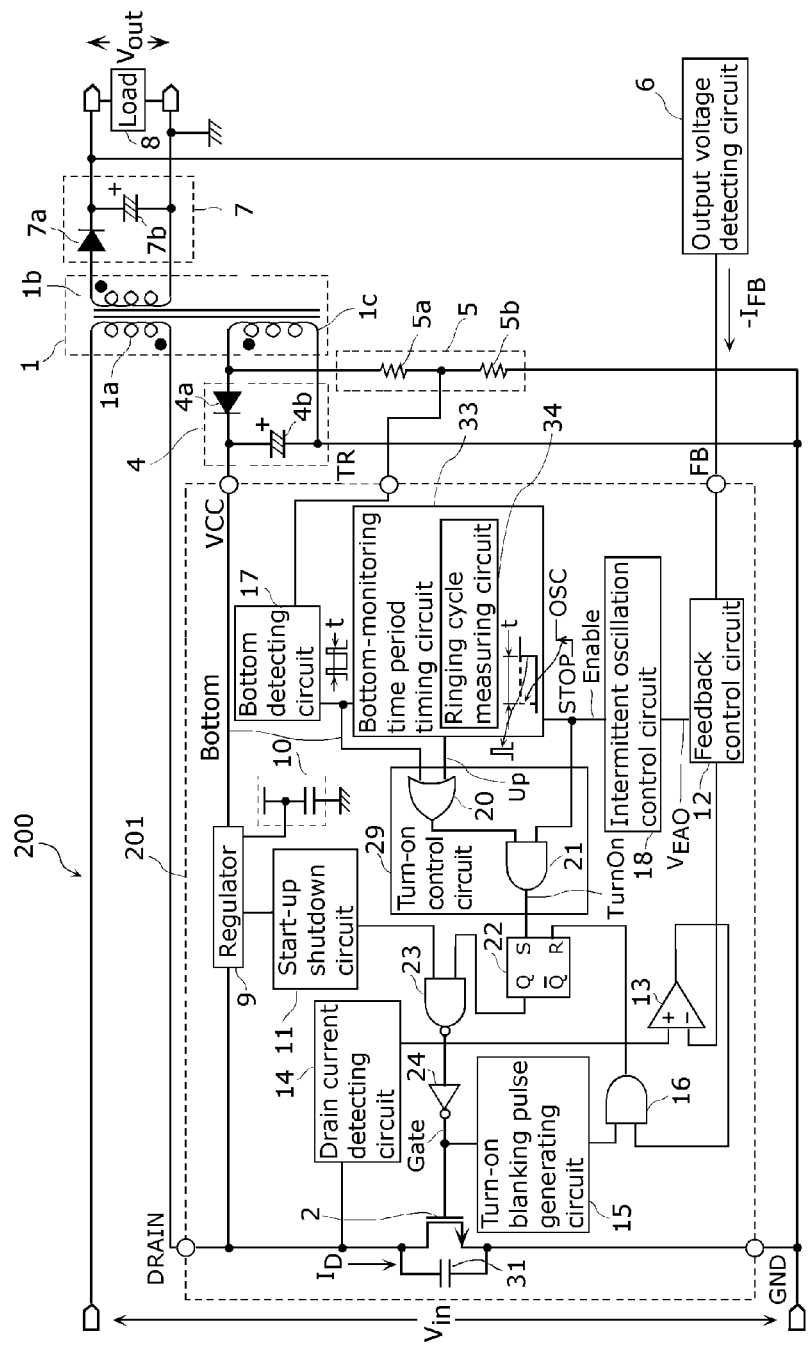
FIG. 8 depicts a functional block diagram exemplifying a structure of a switching power supply device including a semiconductor device according to Embodiment 2 of the present invention.

FIG. 8 depicts a circuit diagram exemplifying a structure of a switching power supply device 200 including a semiconductor device 201 according to Embodiment 2 of the present invention. The semiconductor device 201 works as a control circuit for the switching power supply device 200. Hereinafter, the control circuit implemented by the semiconductor device 201 is referred to as a control circuit 201 having the same numerical sign as the semiconductor device has.

A comparison between the control circuit 201 according to Embodiment 2 and the control circuit 101 according to Embodiment 1 shows that the control circuit 201 has a bottom-monitoring time period timing circuit 33 additionally including a ringing cycle measuring circuit 34.

In Embodiment 1, the bottom-monitoring time period timing circuit 32 measures the bottom-monitoring time period t expressed in Expression 7. In Embodiment 2, the ringing cycle measuring circuit 34 measures, for one cycle, a time period of the ringing of the switching element 2 when the switching operation suspends. Then the bottom-monitoring time period timing circuit 33 times, as a bottom-monitoring time period, a time period corresponding to the measured time period.

The basic idea between the switching power supply device 200 and the switching power supply device 100 is the same in reducing a loss caused by a capacitance between the input and the output of the switching element 2 in the intermittent resumption. Described hereinafter are major differences between the two devices. The constituent features already described in Embodiment 1 have the same reference signs, and the description thereof shall be omitted.

Figure 9:
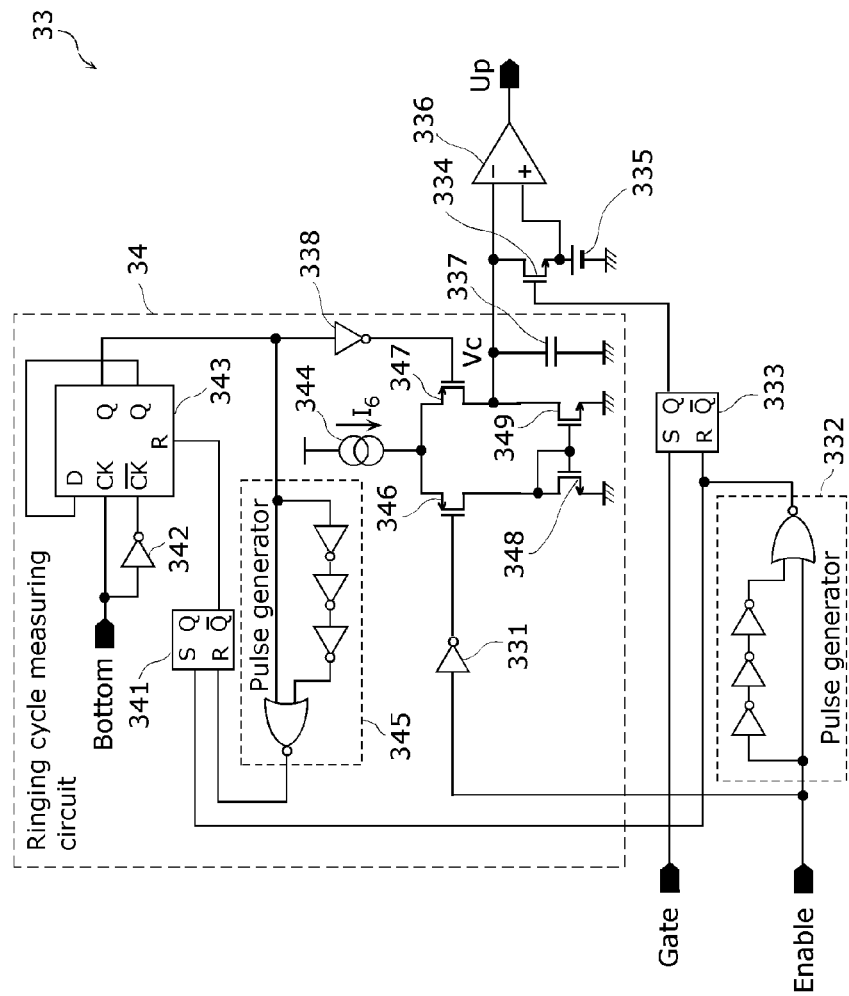
FIG. 9 depicts a circuit diagram exemplifying a structure of a bottom-monitoring time period timing circuit included in the semiconductor device according to Embodiment 2 and including a ringing cycle measuring circuit.

FIG. 9 depicts a specific circuit diagram exemplifying a structure of the bottom-monitoring time period timing circuit 33 including the ringing cycle measuring circuit 34.

Described here is an operation of the bottom-monitoring time period timing circuit 33 shown in FIG. 9.

During the switching operation, a signal Enable applied from the intermittent oscillation control circuit 18 is maintained high. Hence, through a pulse generator 332, a low signal is applied to the reset input R of an RS flip-flop 333. Furthermore, a high signal Gate which turns ON the switching element 2 is periodically applied to the set input S of the RS flip-flop 333, and the output Q of the RS flip-flop 333 is maintained high.

Hence an n-type MOSFET 334 is ON, and a voltage $V_c$ at the high-side of a capacitor 337 is initialized to an initial voltage $V_{init}$; that is a voltage for a constant voltage source 335. Here, a comparator 336 receives the same voltage on the positive and negative inputs and outputs a low signal. The bottom-monitoring time period timing circuit 33 outputs as a signal Up the signal outputted from the comparator 336.

When the signal Enable to be applied to the bottom-monitoring time period timing circuit 33 goes from high to low, the pulse generator 332 applies a high pulse signal to the reset input R of the RS flip-flop 333. Hence the output Q of the RS flip-flop 333 goes low, and the n-type MOSFET 334 turns OFF. Moreover, a p-type MOSFET 346 receives a high gate signal through an inverter circuit 331, and turns OFF.

The pulse signal from the pulse generator 332 is also applied to the set input S of an RS flip-flop 341. Hence the output $\neg Q$ of the RS flip-flop 341 is brought low. Consequently, the reset input R of a D flip-flop 343 is brought low. The reset of the D flip-flop 343 is canceled, and the D flip-flop is ready to operate.

At this moment, the output Q of the D flip-flop 343 is low. Hence the high gate signal is applied to a p-type MOSFET 347 through an inverter circuit 338, and the low signal is applied to the reset input R of the RS flip-flop 341 through a pulse generator 345.

After the intermittent suspension, as soon as the bottom detecting circuit 17 detects the first bottom on the ringing voltage of the switching element 2, the signal Bottom is applied to the clock input CK of the D flip-flop 343. Furthermore, through an inverter 342, a signal $\neg$Bottom is applied to the clock input $\neg$CK of the D flip-flop 343. Here, the output Q of the D flip-flop 343 switches from low to high, the gate signal for the p-type MOSFET 347 goes low through the inverter circuit 338, and the p-type MOSFET 347 turns ON. Consequently, charges are provided from a constant current source 344 through the p-type MOSFET 347 to the capacitor 337, and the capacitor 337 accumulates the charges at a constant speed.

Next, when the second bottom is detected on the ringing voltage of the switching element 2, the signal Bottom and signal $\neg$Bottom are applied to the clock input CK and the clock input $\neg$CK, respectively. Thus the output Q of the D flip-flop 343 goes from high to low. Consequently, the gate signal for the p-type MOSFET 347 goes high through the inverter circuit 338, the p-type MOSFET 347 turns OFF, and the charges from the constant current source 344 to the capacitor 337 are cut. In other words, after the signal Enable outputted from the intermittent oscillation control circuit 18 goes low, the voltage at the high-side of the capacitor 337 is held at a voltage observed when the bottom detecting circuit 17 detects the second bottom on the ringing voltage of the switching element 2.

At the same time, since the pulse generator 345 outputs a pulse signal to the reset input R of the RS flip-flop 341, the output $\neg Q$ of the RS flip-flop 341 goes high, and the high signal is applied to the set input S of the D flip-flop 343. Consequently, the D flip-flop 343 is fixed reset, and suspends its operation.

As described above, during the one-cycle ringing of the switching element 2, the constant current source 344 charges the capacitor 337 and the capacitor 337 holds as much a voltage as for the one-cycle ringing.

Then, when the signal Enable to be applied to the bottom-monitoring time period timing circuit 33 goes from low to high, the p-type MOSFET 346 receives the low gate signal through the inverter circuit 331, and turns ON. Hence, through n-type MOSFETs 348 and 349 forming a mirror circuit, a current from the constant current source 344 takes the charges accumulated in the capacitor 337 at a constant speed. Here, a preferable mirror ratio of the n-type MOSFET 348 to the n-type MOSFET 349 is one to one.

After the signal Enable goes high, the voltage $V_C$ of the capacitor 337 gradually decreases. When the voltage $V_C$ of the capacitor 337 goes below the voltage of the constant voltage source 335, that is the initial voltage when the charge starts, the output of the comparator 336 goes high. Hence the bottom-monitoring time period timing circuit 33 times, as a bottom-monitoring time period, the time period for one-cycle ringing of the switching element 2.

The overall operation of the bottom-monitoring time period timing circuit 33 shall be described with reference to the timing diagrams (a) and (b) in FIG. 10.

Figure 10:
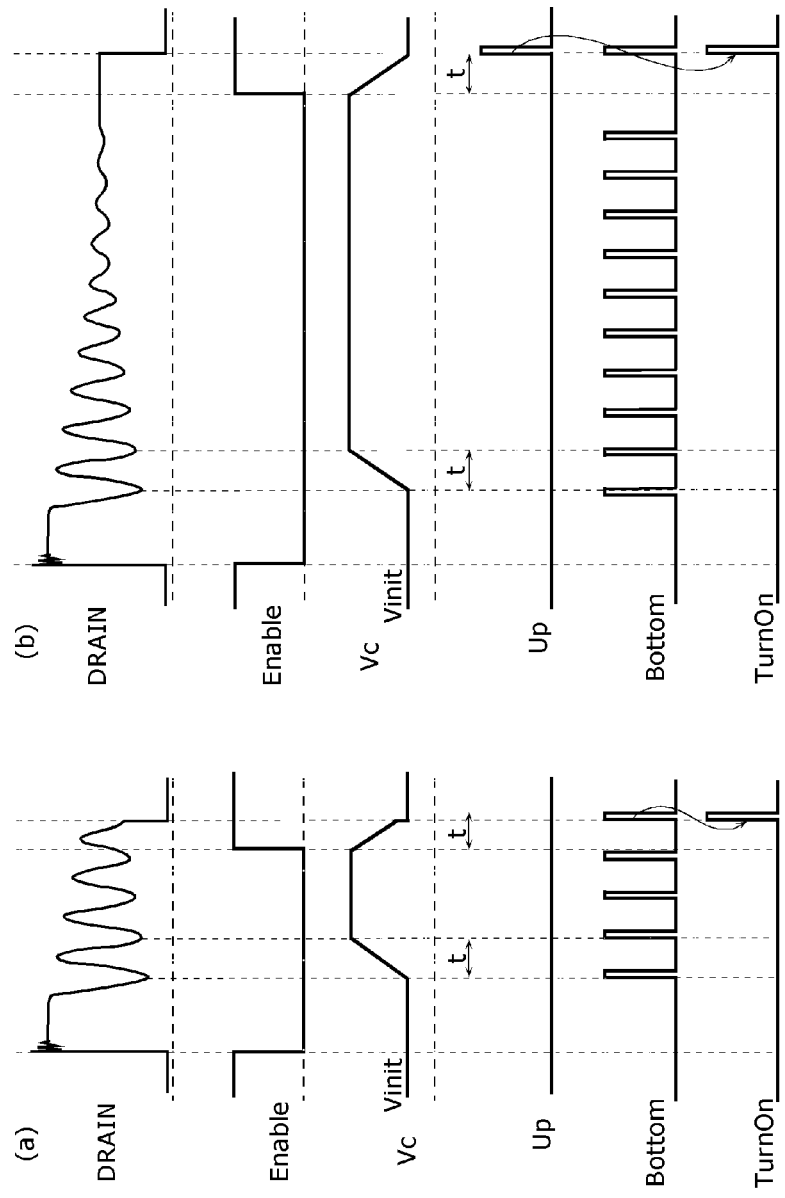
FIG. 10 depicts timing diagrams (a) and (b) exemplifying an operation of the switching power supply device including the semiconductor device according to Embodiment 2.

Compared with the timing diagrams (a) and (b) in FIG. 7, the timing diagrams (a) and (b) in FIG. 10 additionally shows the voltage $V_C$ at the high-side of the capacitor 337 included in the ringing cycle measuring circuit 34. The timing diagram (a) in FIG. 10 shows the case where the signal Bottom arrives between the rise of the signal Enable and the end of the time period for the one-cycle ringing of the switching element 2. The timing diagram (b) in FIG. 10 shows the case where the signal Bottom does not arrive between the rise of the signal Enable and the end of the one-cycle ringing of the switching element 2.

When the load becomes heavy after the suspension of the intermittent oscillation and the signal Enable to be outputted from the intermittent oscillation control circuit 18 goes from low to high, the following is observed in the ringing cycle measuring circuit 34: Accumulated during the suspension in the capacitor 337 included in the ringing cycle measuring circuit 34, the charges are taken at a constant rate and the voltage $V_C$ of the capacitor 337 gradually decreases.

As shown in the timing diagram (a) in FIG. 10, in the case where the bottom detecting circuit 17 provides the signal Bottom before the voltage $V_C$ of the capacitor 337 goes below the initial voltage $V_{init}$ (that is the voltage of the constant voltage source 335), the signal Bottom is applied from the bottom detecting circuit 17 to the OR circuit 20 in FIG. 8. Thus the signal TurnOn is applied through the AND circuit 21 to the set input S of the RS flip-flop 22. Then the switching element 2 turns ON.

In the intermittent resumption, when the bottom detecting circuit 17 detects a bottom on the ringing voltage of the switching element 2 within a time period t measured by the ringing cycle measuring circuit 34 and designated for the one-cycle ringing of the switching element 2, the switching element in the intermittent resumption turns ON at the bottom on the ringing voltage. This operation suspends the timing of the bottom-monitoring time period. In the operation, the signal Up outputted from the bottom-monitoring time period timing circuit 33 is maintained low, and does not go high.

As shown in the timing diagram (b) in FIG. 10, in the case where the bottom detecting circuit 17 does not provide the signal Bottom until the voltage $V_C$ of the capacitor 337 goes below the initial voltage $V_{init}$, the UP signal, that is a signal outputted from the comparator 336, goes high.

Here, the signal Up is applied from the bottom-monitoring time period timing circuit 33 to the OR circuit 20 in FIG. 8. Then the signal TurnOn is applied through the AND circuit 21 to the set input S of the RS flip-flop 22, and the switching element 2 turns ON. In the intermittent resumption, in the case where a signal is not outputted from the bottom detecting circuit 17 within the time-period t for the one-cycle ringing of the switching element 2, the switching element 2 is forced to turn OFF after the elapse of the time-period t for the one-cycle ringing of the switching element 2.

When the switching element 2 turns ON, the high signal Gate is applied to the set input S of the RS flip-flop 333 included in the bottom-monitoring time period timing circuit 33 shown in FIG. 9. The n-type MOSFET 334 turns ON upon receiving the high gate signal from the output Q of the RS flip-flop 333. The voltage $V_C$ at the high-side of the capacitor 337 is initialized to the initial voltage $V_{init}$ that is a voltage of the constant voltage source 335.

In Embodiment 2, the ringing cycle measuring circuit 34 measures one period for the ringing of the switching element 2 when the switching operation is under suspension. Hence, the switching power supply device 200 according to Embodiment 2 is applicable to a greater variety of situations than the switching power supply device 100 according to Embodiment 1 is. In Embodiment 1 the bottom-monitoring time period t is fixed, which makes it difficult to set the optimum time period for all the power supply specifications. In contrast, even though there is a change in an operational environment for a device, such as power specifications and ambient temperatures, Embodiment 2 can implement monitoring the ringing of the switching element 2 for one period, and conforming the bottom-monitoring time period t with the one-cycle time period for the ringing of the switching element 2. Such a feature successfully makes the switching power supply device 200 applicable to any operational environment.

Furthermore, compared with Embodiment 1, the conformity of the bottom-monitoring time period t with a ringing cycle gives the switching power supply device 200 excellent power supply characteristics, such as high responsiveness when a sudden change occurs in an output load and small output ripples.

Embodiment 3

Described here is a switching power supply device according to Embodiment 3 of the present invention.

Figure 11:
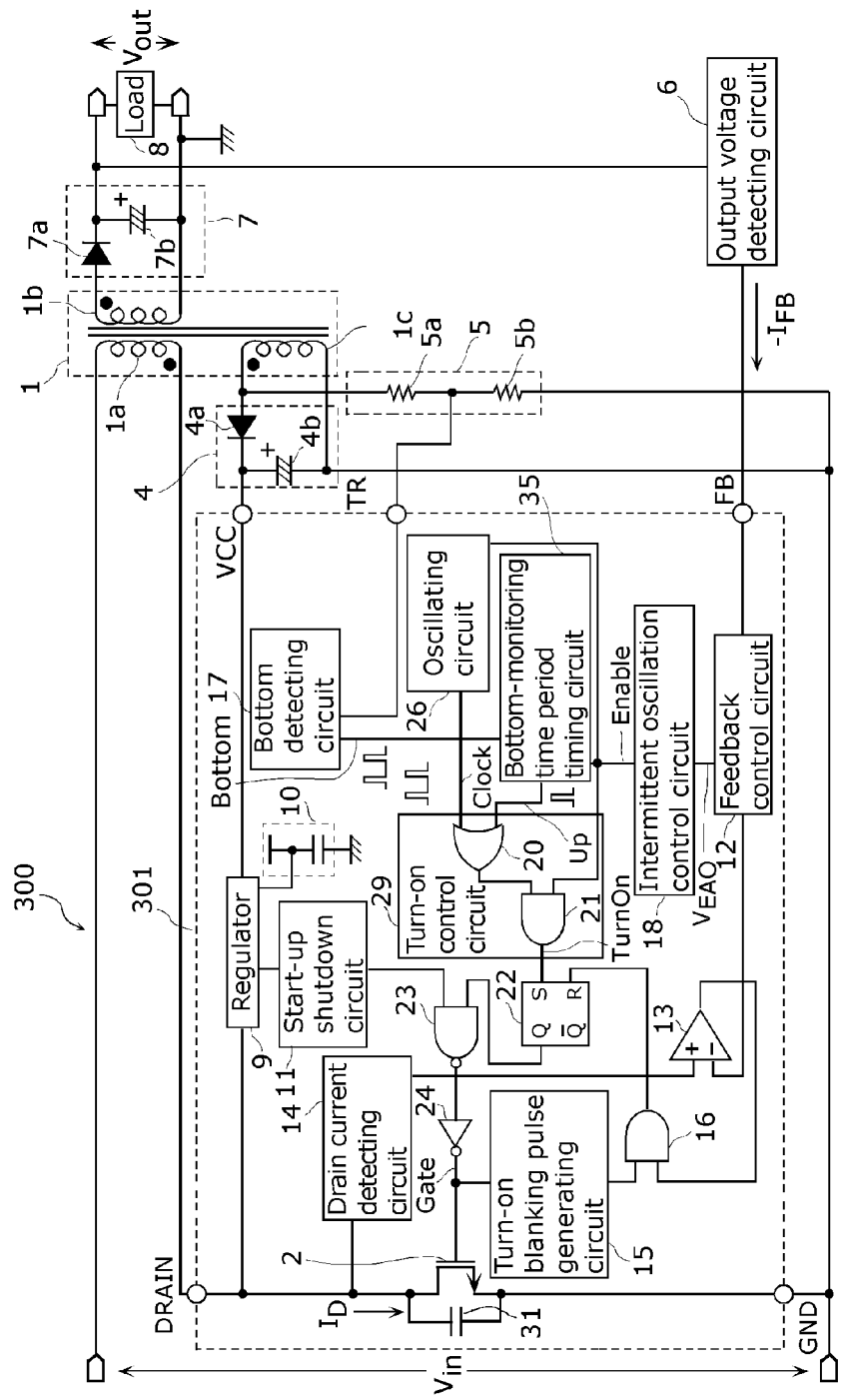
FIG. 11 depicts a functional block diagram exemplifying a structure of a switching power supply device including a semiconductor device according to Embodiment 3 of the present invention.

FIG. 11 depicts a circuit diagram exemplifying a structure of a switching power supply device 300 including a semiconductor device according to Embodiment 3 of the present invention. A semiconductor device 301 works as a control circuit for the switching power supply device 300. Hereinafter, the control circuit implemented by the semiconductor device 301 is referred to as a control circuit 301 having the same numerical sign as the semiconductor device has.

Compared with the control circuit 101 according to Embodiment 1, the control circuit 301 according to Embodiment 3 additionally has an oscillating circuit 26, and includes a bottom-monitoring time period timing circuit 35 instead of the bottom-monitoring time period timing circuit 32.

It is noted that the switching power supply device 100 according to Embodiment 1 and the switching power supply device 200 according to Embodiment 2 are applicable to the quasi-resonant control that causes the switching element 2 to turn ON at a bottom of ringing. The switching power supply device 300 according to Embodiment 3 is expected to be applied to the PWM control.

The basic idea between the switching power supply device 300 and the switching power supply device 200 is the same in reducing a loss caused by a capacitance between the input and the output of the switching element 2 in the intermittent resumption. Described hereinafter are major differences between the two devices. The constituent features already described in Embodiments 1 and 2 have the same reference signs, and the description thereof shall be omitted.

Figure 12:
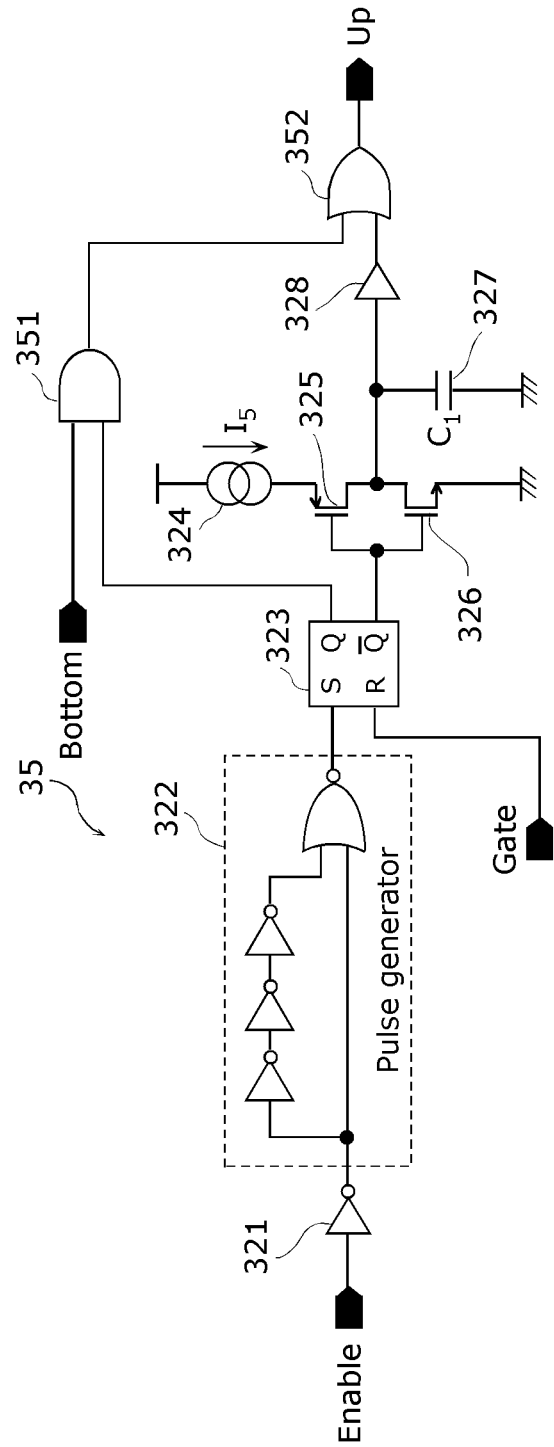
FIG. 12 depicts a circuit diagram exemplifying a structure of a bottom-monitoring time period timing circuit included in the semiconductor device according to Embodiment 3.

FIG. 12 depicts a circuit diagram exemplifying a specific circuit structure of the bottom-monitoring time period timing circuit 35 in FIG. 11. Compared with the bottom-monitoring time period timing circuit 32 shown in FIG. 6, the bottom-monitoring time period timing circuit 35 additionally has an AND circuit 351 and an OR circuit 352 which output, as a signal Up, a signal Bottom that arrives while a bottom-monitoring time period is being timed.

Figure 13:
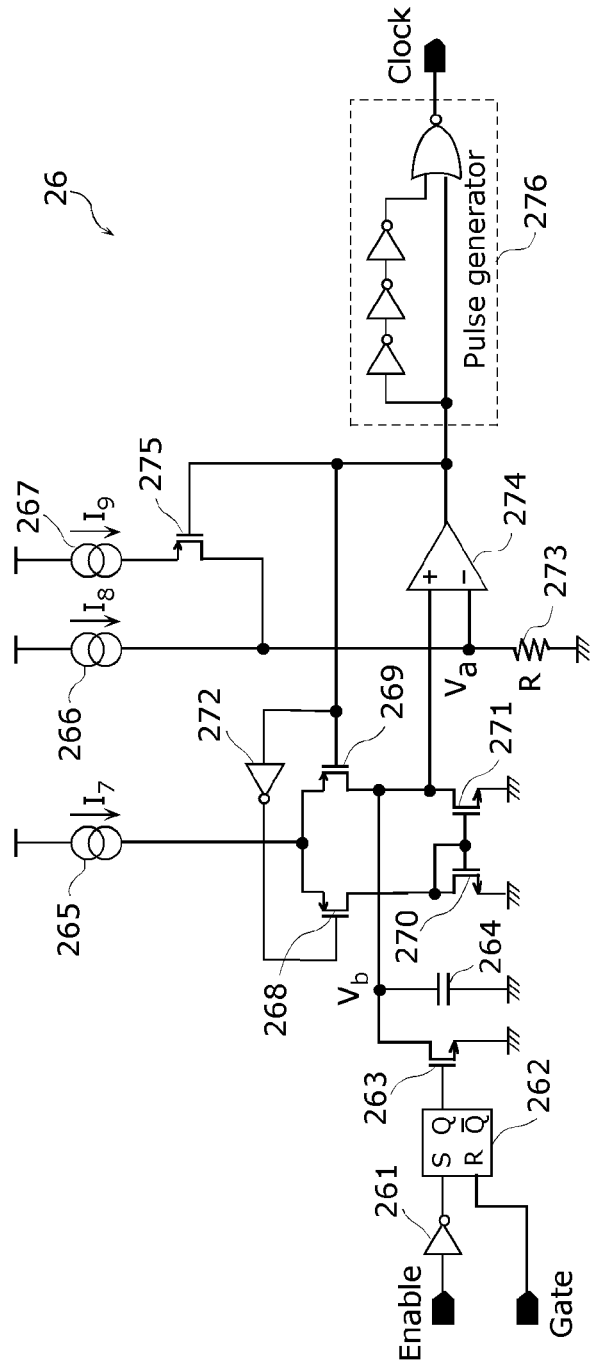
FIG. 13 depicts a circuit diagram exemplifying a structure of an oscillating circuit included in the semiconductor device according to Embodiment 3.

FIG. 13 depicts a circuit diagram exemplifying a specific circuit structure of an oscillating circuit 26.

FIG. 13 shows how the oscillating circuit 26 operates.

When the signal Enable to be provided from the intermittent oscillation control circuit 18 is high, that is when the switching operation is being carried out, a low signal is applied through an inverter circuit 261 to the set input S of an RS flip-flop 262. On the other hand, a signal Gate is applied to the reset input R of the RS flip-flop 262. Thus the output Q of the RS flip-flop 262 is maintained low. Here, an n-type MOSFET 263 receives a low gate signal, and remains OFF.

Suppose an output signal from a comparator 274 is low. Then both p-type MOSFETs 269 and 275 receives the low gate signal, and turn ON. It is noted that a signal Clock outputted from a pulse generator 276 is low.

Furthermore, a p-type MOSFET 268 receives the high gate signal through an inverter circuit 272, and turns OFF. Here, a constant current $I_7$ from a constant current source 265 runs through the p-type MOSFET 269 and is charged in a capacitor 264. Consequently, a voltage $V_b$ at the high-side of the capacitor 264 rises. Moreover, when $I_8$ is a constant current value for a constant current source 266, $I_9$ is a constant current value for a constant current source 267, and R is a resistance value for a resistor 273, a reference voltage $V_a$ for the comparator 274 changes from $R \times I_8$ to $R \times (I_8+I_9)$. When the voltage $V_b$ at the high-side of the capacitor 264 rises to the reference voltage $V_a$ for a comparator 273, the output from the comparator 274 goes from low to high. Accordingly, p-type MOSFETs 275 and 269 receive the high gate signal, and turn OFF.

Furthermore, the p-type MOSFET 268 receives the low gate signal through an inverter circuit 272, and turns ON.

Here, the constant current $I_7$ from the constant current source 265 runs through the p-type MOSFET 268 and flows into an n-type MOSFET 270. Accordingly, the constant current $I_7$ flows in an n-type MOSFET 271 which forms a mirror circuit. In other words, the n-type MOSFET 271 takes charges from the capacitor 264 at a constant speed, and the voltage $V_b$ at high-side of the capacitor 264 decreases. At the same time, the reference voltage $V_a$ for the comparator 274 changes from $R \times (I_8+I_9)$ to $R \times I_8$. When the voltage $V_b$ at high-side of the capacitor 264 decreases as low as or below the reference voltage $V_a$ for the comparator 274, the output of the comparator 274 goes from high to low and the signal Clock, which is a pulse signal, is outputted through the pulse generator 276.

As described above, the voltage $V_b$ at high-side of the capacitor 264 becomes a triangle wave. At the moment when the output signal from the comparator 274 goes from high to low, the pulse generator 276 outputs the signal Clock. As described above, during the execution of the switching operation, the signal Clock is outputted from the oscillating circuit 26 at a constant cycle.

Next, when the signal Enable applied from the intermittent oscillation control circuit 18 goes low, that is when the switching operation is suspended, the set input S of the RS flip-flop 262 receives a high signal through the inverter circuit 261. Thus the output Q of the RS flip-flop 262 goes high, the n-type MOSFET 263 turns ON, and the voltage $V_b$ at the high-side of the capacitor 264 is fixed to the GND level.

Figure 14:
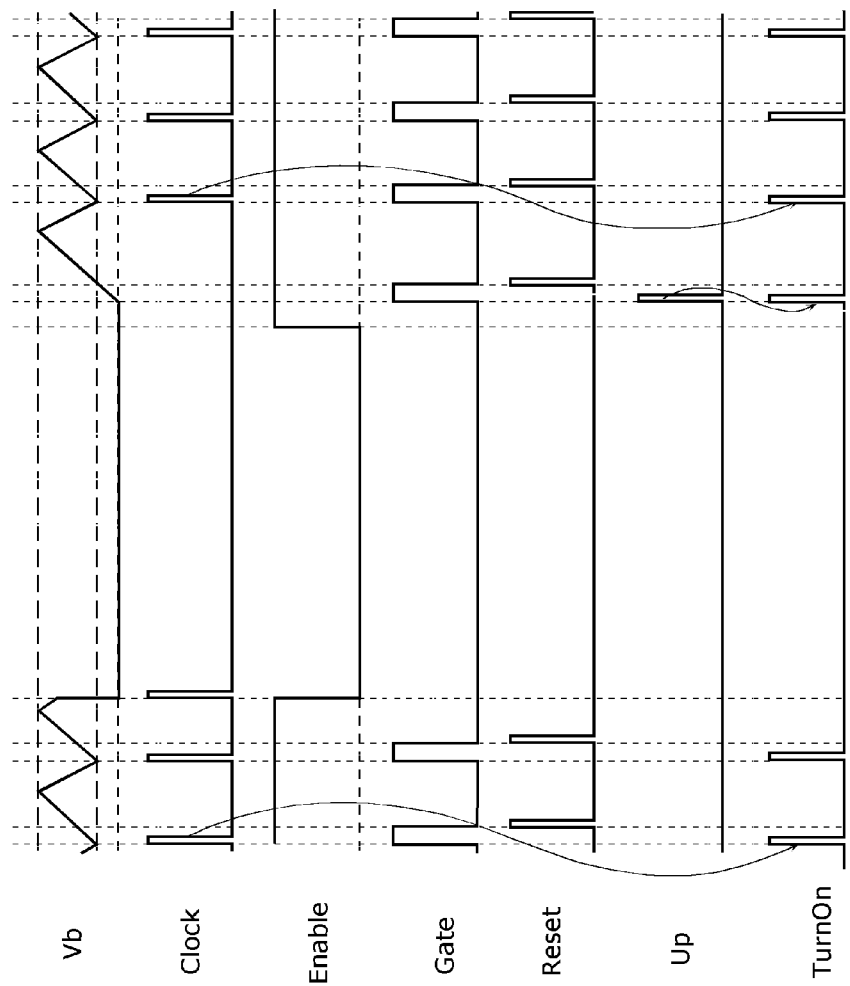
FIG. 14 depicts a timing diagram exemplifying an operation including an exemplified structure of the oscillating circuit included in the semiconductor device according to Embodiment 3.

The timing diagram in FIG. 14 shows how the switching power supply device 300 operates when the signal Enable to be outputted from the intermittent oscillation control circuit 18 goes from low to high.

FIG. 14 exemplifies waveforms of the following: the voltage $V_b$, the signal Clock, the signal Enable, the signal Gate, a signal Reset to be applied to the reset input R of the RS flip-flop 22 in FIG. 11, the signal Up, and the signal TurnOn.

When the signal Enable is high, the signal Clock is applied, as the signal TurnOn, to the set input S of the RS flip-flop 22, and the signal Gate is outputted. When the signal Enable goes low, the voltage $V_b$ for the capacitor 264 in the oscillating circuit 26 is brought to the GND level.

When the load becomes heavy and the signal Enable outputted from the intermittent oscillation control circuit 18 goes from low to high while the switching operation is under suspension, the bottom-monitoring time period timing circuit 35 times a bottom-monitoring time period t which starts as soon as the rise of the signal Enable is observed. When finishing the timing of the bottom-monitoring time period t, the bottom-monitoring time period timing circuit 35 outputs the high signal Up through the OR circuit 352.

Moreover, the OR circuit 352 receives the signal Bottom from the bottom detecting circuit 17 through the AND circuit 351. In the bottom-monitoring time period timing circuit 35, in the case where the signal Bottom is applied before the timing of the bottom-monitoring time period t ends, the signal Bottom is outputted as the signal Up through the OR circuit 352.

When the bottom-monitoring time period timing circuit 35 outputs the high signal Up, as shown in FIG. 11, the signal TurnOn is applied to the set input S of the RS flip-flop 22 through the OR circuit 20 and the AND circuit 21. Consequently, the switching element 2 turns ON.

Here the signal Gate is applied to the reset input R of the RS flip-flop 323 in the bottom-monitoring time period timing circuit 35. Then the signal Up, which is the output Q of the RS flip-flop 323, goes low.

Moreover, the signal Gate is also applied to the reset input R of the RS flip-flop 262 in the oscillating circuit 26. Hence the output Q of the RS flip-flop 262 goes low, and the n-type MOSFET 263 turns OFF. At the same time, the constant current $I_7$ from the constant current source 265 runs through p-type MOSFET 269 and is charged in the capacitor 264, and the voltage $V_b$ of at the high-side of the capacitor 264 increases. Consequently, the switching operation resumes.

Figure 15:
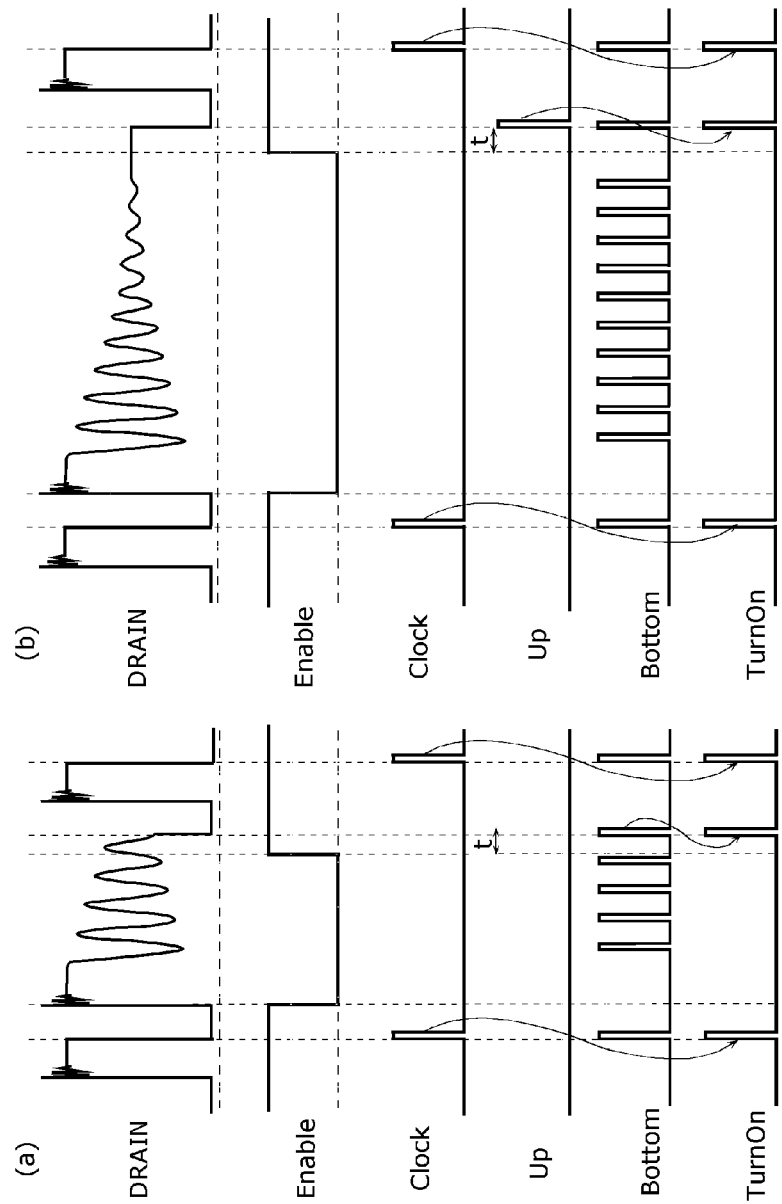
FIG. 15 depicts timing diagrams (a) and (b) exemplifying an operation of the switching power supply device including the semiconductor device according to Embodiment 3.
Figure 16:
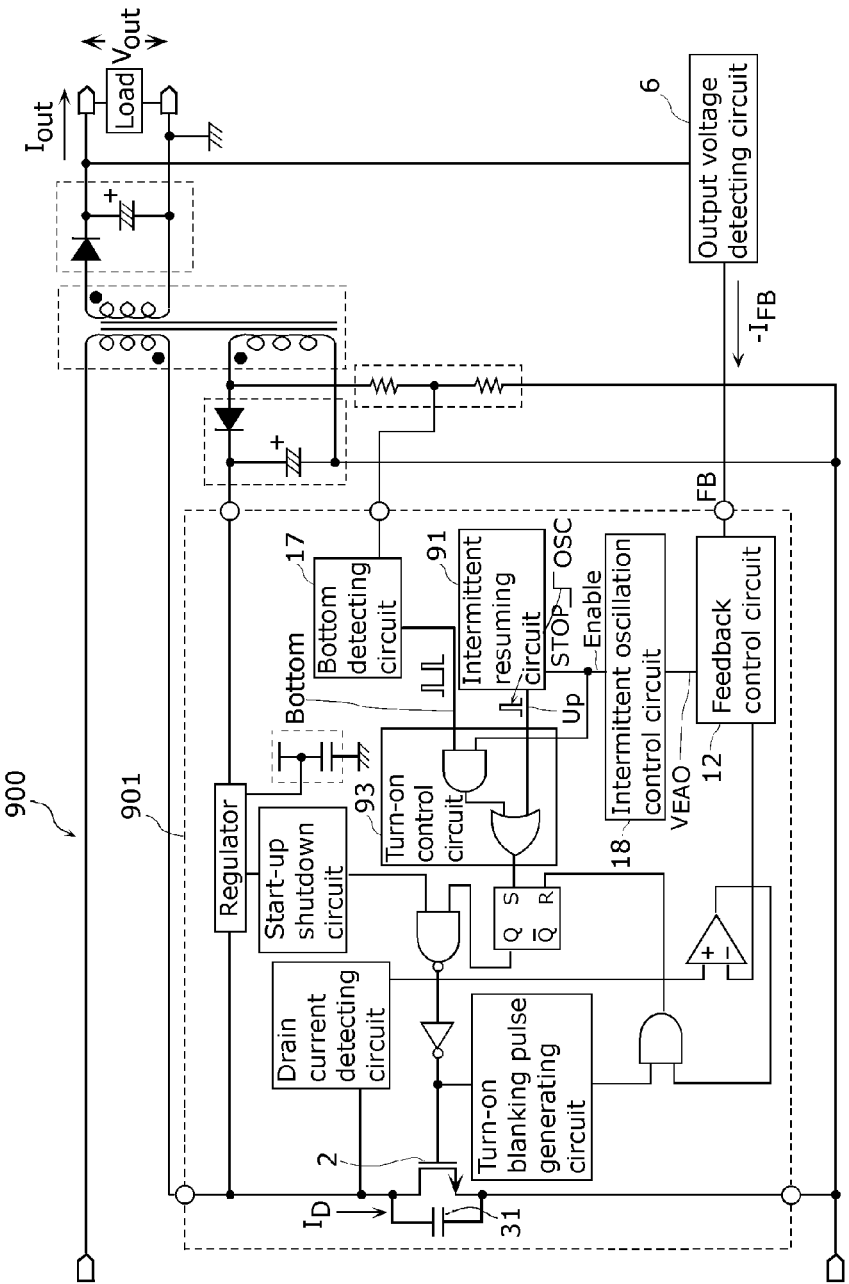
FIG. 16 depicts a functional block diagram exemplifying a structure of a switching power supply device including a semiconductor device having a conventional intermittent oscillation control circuit.
Figure 17:
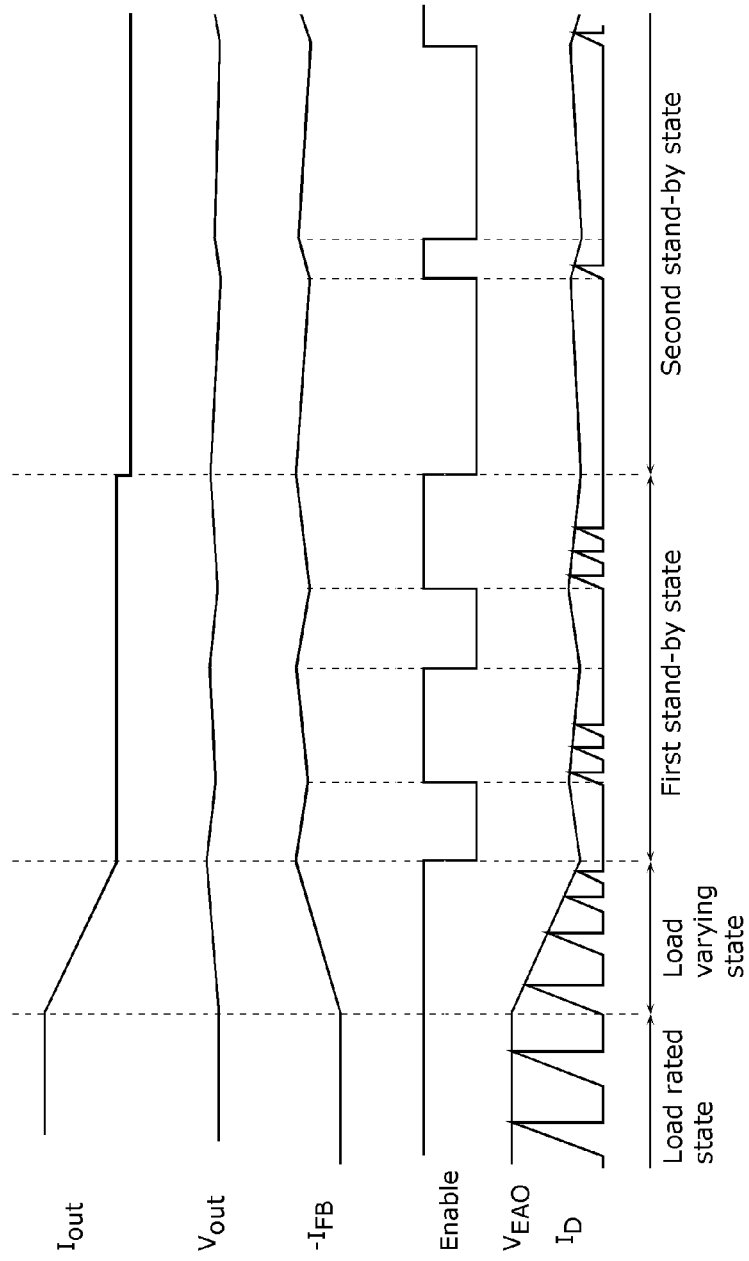
FIG. 17 depicts a timing diagram showing how the switching power supply device including the semiconductor device having the conventional intermittent oscillation control circuit causes a switching element to perform intermittent oscillation.
Figure 18:
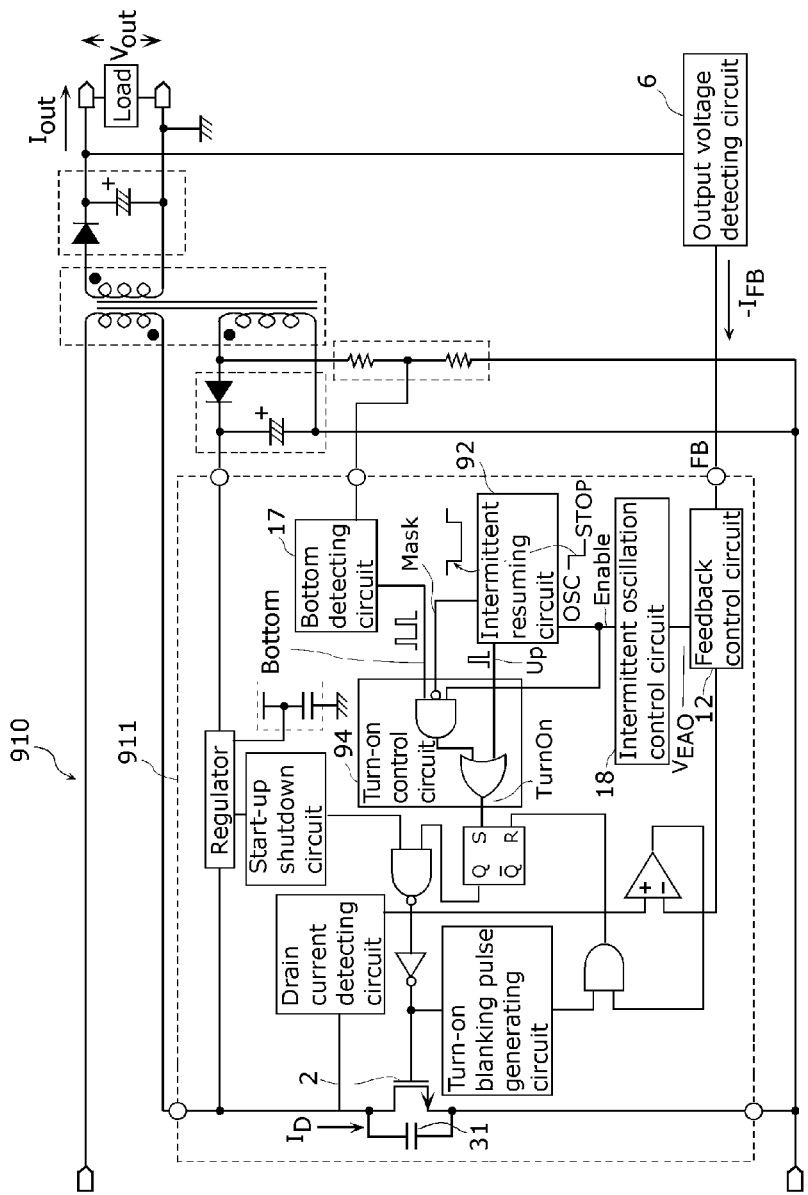
FIG. 18 depicts a functional block diagram exemplifying a structure of a switching power supply device including a semiconductor device having a conventional intermittent oscillation control circuit.
Figure 19:
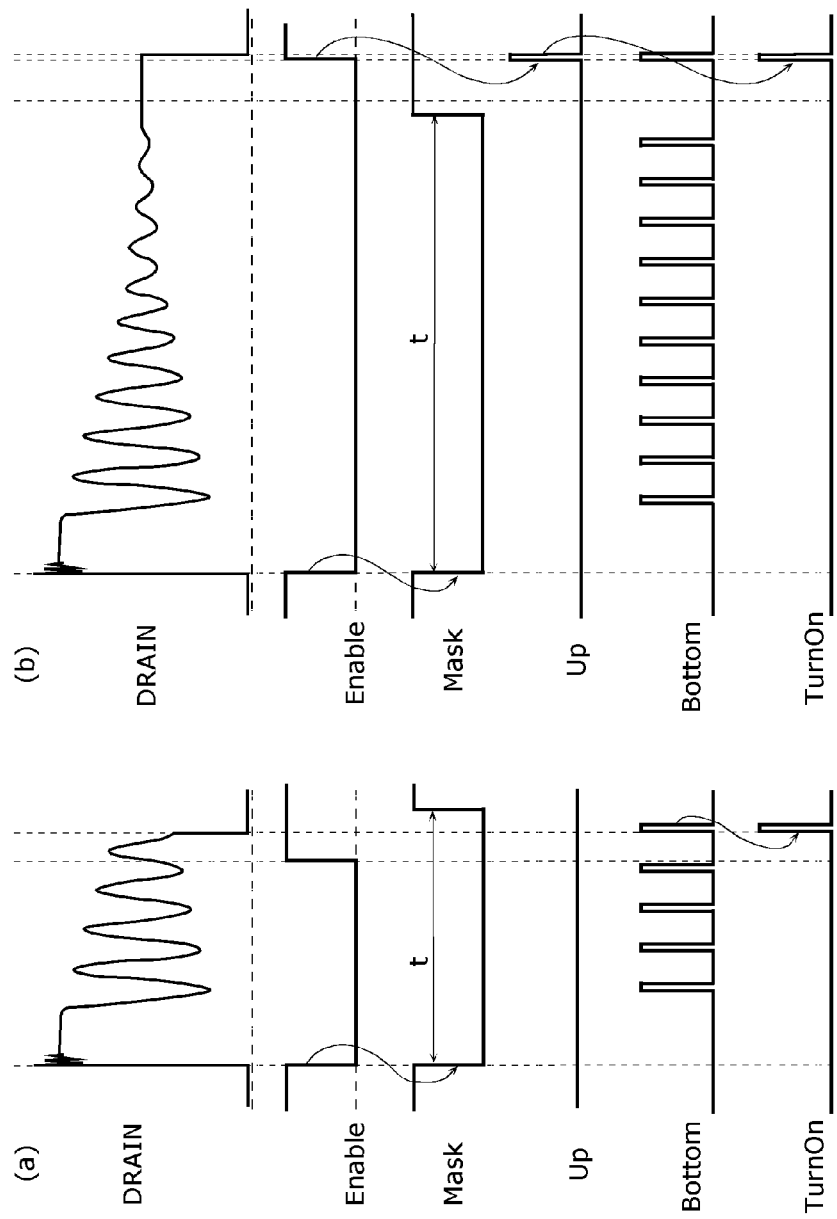
FIG. 19 depicts timing diagrams (a) and (b) showing a preferable operation on the switching power supply device including the semiconductor device having the conventional intermittent oscillation control circuit.
Figure 20:
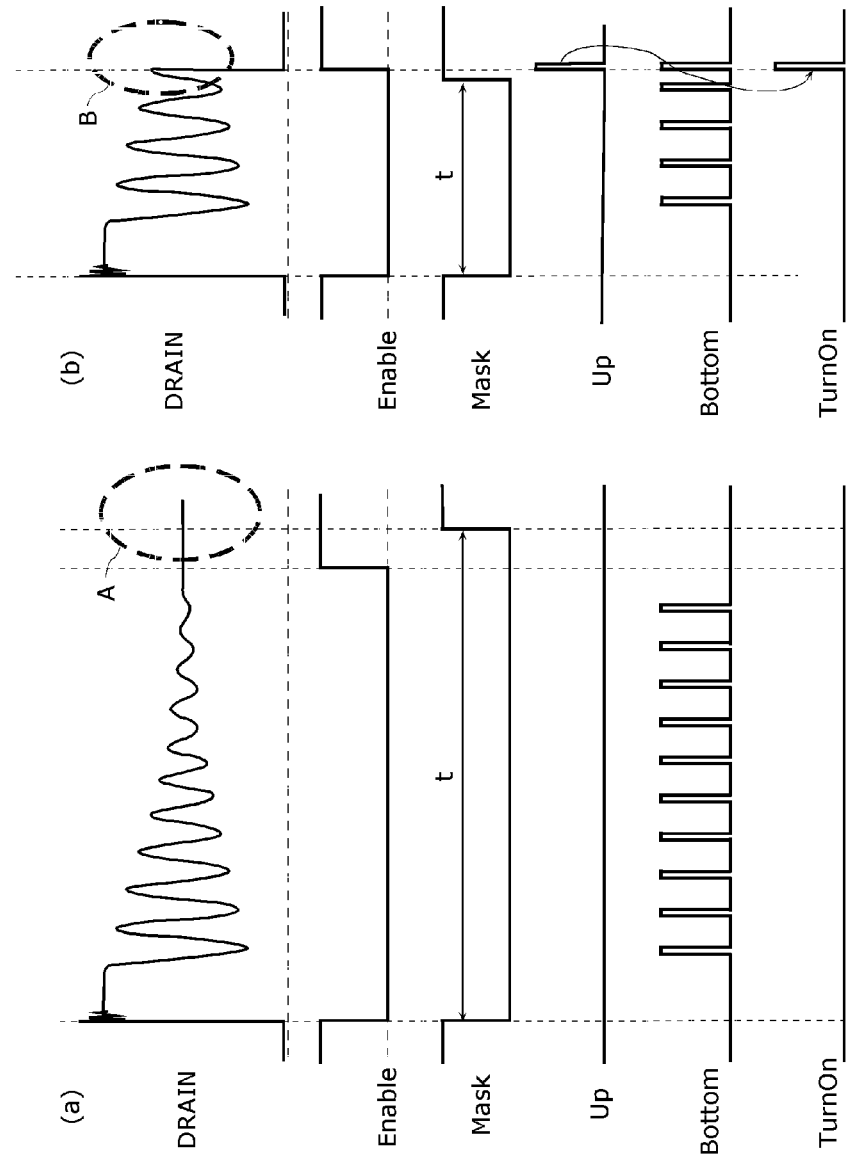
FIG. 20 depicts timing diagrams (a) and (b) showing a problematic operation on the switching power supply device including the semiconductor device having the conventional intermittent oscillation control circuit.

The timing diagrams (a) and (b) in FIG. 15 additionally show waveforms of the drain voltage of the switching element 2. As shown in the timing diagrams (a) and (b) in FIG. 7, the timing diagrams (a) and (b) in FIG. 15 show the following: The timing diagram (a) shows the case where the signal Bottom arrives within the bottom-monitoring time period obtained from Expression 7, and the timing diagram (b) shows the case where the signal Bottom does not arrive within bottom-monitoring time period.

As shown in (a) in FIG. 15, in the case where the signal Bottom arrives from the bottom detecting circuit 17 within the bottom-monitoring time period t obtained from Expression 7, the signal Bottom from the bottom detecting circuit 17 is applied to the OR circuit 352 in FIG. 12 and outputted as the signal Up. Consequently, the switching element 2 turns ON.

In the intermittent resumption, when the bottom detecting circuit 17 detects a bottom on the ringing voltage within the bottom-monitoring time period t timed by the bottom-monitoring time period timing circuit 35, the switching element 2 turns ON at the bottom on the ringing voltage.

As shown in (b) in FIG. 15, in the case where the signal Bottom does not arrive from the bottom detecting circuit 17 within the bottom-monitoring time period t obtained from Expression 7, the output of the buffer circuit 328 goes high when the bottom-monitoring time period timing circuit 35 finishes timing the bottom-monitoring time period t. Consequently, the switching element 2 turns ON.

In the intermittent resumption, when the signal Bottom does not arrive from the bottom detecting circuit 17 within bottom-monitoring time period t timed by the bottom-monitoring time period timing circuit 35, the switching element 2 is forced to turn ON after the elapse of the bottom-monitoring time period t set by the bottom-monitoring time period timing circuit 35.

Hence, Embodiment 3 is applicable to the PWM control as Embodiment 1 is as follows: When the signal Enable goes from low to high, (i) in the case where a bottom on the ringing voltage of the switching element 2 is detected by the bottom detecting circuit 17 within the bottom-monitoring time period t timed by the bottom-monitoring time period timing circuit 35, the switching element 2 turns ON as soon as the bottom is detected, and (ii) in the case where a bottom on the ringing voltage of the switching element 2 is not detected by the bottom detecting circuit 17 within the bottom-monitoring time period t timed by the bottom-monitoring time period timing circuit 35, the switching element 2 is forced to turn ON after the elapse of the bottom-monitoring time period t timed by the bottom-monitoring time period timing circuit 35.

It is noted that Embodiment 3 may be combined with Embodiment 2, so that the time period for detecting a bottom in the intermittent resumption for the switching element 2 by the bottom detecting circuit 17 may be set by the ringing cycle measuring circuit 34 to a time period for one-cycle ringing of the switching element 2.

Furthermore, the PWM control is mentioned in Embodiment 2; instead, Embodiment 3 is also effective for another technique to control a switching power supply, such as the PFM control and the secondary duty control.

INDUSTRIAL APPLICABILITY

The switching power supply device and the semiconductor device of the present invention are effective in use for a switching power supply device for an AC-DC converter and a DC-DC converter.

REFERENCE SIGNS LIST

1 Transformer
1a Primary winding
1b Secondary winding
1c Auxiliary winding
2 Switching element
4 Rectifying and smoothing circuit
4a and 7a Rectifying diode
4b, 7b, 31, 264, 327, and 337 Capacitor
5 Auxiliary winding voltage-dividing circuit
5a, 5b, 133, 173, 183, and 273 Resistor
6 Output voltage detecting circuit
7 Output voltage generating unit
8 Load
9 Regulator
10 Internal circuit voltage source
11 Start-up shutdown circuit
12 Feedback control circuit
13, 174, 184, 274, and 336 Comparator
14 Drain current detecting circuit
15 Turn-on blanking pulse generating circuit
16, 21, and 351 AND circuit
17 Bottom detecting circuit
18 Intermittent oscillation control circuit
20 and 352 OR circuit
22, 262, 323, 333, and 341 RS flip-flop
23 NAND circuit
24 Gate driver 24
26 Oscillating circuit
121, 122, 171, 172, 181, 182, 265, 266, 267, 324, and 344 Constant current source
29 Turn-on control circuit
32, 33, and 35 Bottom-monitoring time period timing circuit
34 Ringing cycle measuring circuit
91 and 92 Intermittent resuming circuit
100, 200, 300, 900, and 910 Switching power supply device
101, 201, 301, 901, and 911 Control circuit (Semiconductor device)
123, 124, 175, 185, 268, 269, 275, 325, 346, and 347 P-type MOSFET
125, 126, 127, 129, 263, 270, 271, 326, 334, 348, and 349 N-type MOSFET
128, 132, and 335 Constant voltage source
130 I-V converter
131 NPN bipolar transistor 131
176, 276, 322, 332, and 345 Pulse generator
261, 272, 321, 331, 338, and 342 Inverter circuit
328 Buffer circuit
343 D flip-flop

The invention claimed is:

1. A semiconductor device which controls a switching power supply that causes a switching element to intermittently execute a switching operation to alternately supply and cut an input direct current (DC) voltage so as to convert the input DC voltage into a regulated output DC voltage, the semiconductor device comprising:

an intermittent oscillation control circuit which selectively gives one of an instruction for execution of the switching operation and an instruction for suspension of the switching operation, according to a level of the regulated output DC voltage;

a bottom detecting circuit which detects, when the switching element is OFF, a bottom indicating a local minimum point of a ringing voltage that develops in the switching element;

a bottom-monitoring time period timing circuit which times a bottom-monitoring time period for which the bottom of the ringing voltage is to be monitored, the bottom-monitoring time period starting as soon as the intermittent oscillation control circuit gives the instruction for the execution of the switching operation; and a turn-on control circuit which turns ON, while the bottom-monitoring time period is being timed, the switching element only when the bottom detecting circuit detects the bottom of the ringing voltage.

2. The semiconductor device according to claim 1, wherein the bottom-monitoring time period timing circuit times, as the bottom-monitoring time period, a length of the ringing voltage for one cycle or longer.

3. The semiconductor device according to claim 1, wherein the turn-on control circuit turns ON the switching element when the timing of the bottom-monitoring time period ends, regardless of the bottom of the ringing voltage.

4. The semiconductor device according to claim 1, wherein the bottom-monitoring time period timing circuit suspends the timing of the bottom-monitoring time period when a gate signal of the switching element is brought to an ON level during the timing of the bottom-monitoring time period.

5. The semiconductor device according to claim 1, wherein the bottom-monitoring time period timing circuit includes a constant current source and a capacitor, and times the bottom-monitoring time period based on a time constant to be determined by a current value of the constant current source and a capacitance value of the capacitor.

6. The semiconductor device according to claim 1,
wherein the bottom-monitoring time period timing circuit includes a ringing cycle measuring circuit which measures a ringing cycle after the intermittent oscillation control circuit gives the instruction for the suspension of the switching operation, the ringing cycle being a time period between a first bottom and a second bottom of the ringing voltage, and
the bottom-monitoring time period timing circuit times, as the bottom-monitoring time period, a time period corresponding to the measured ringing cycle.

7. The semiconductor device according to claim 6, wherein the ringing cycle measuring circuit includes a constant current source and a capacitor, and (i) starts charging the capacitor, using a current generated by the constant current source, when the bottom detecting circuit detects the first bottom and (ii) finishes charging the capacitor when the bottom detecting circuit detects the second bottom.

8. The semiconductor device according to claim 7, wherein the bottom-monitoring time period timing circuit (i) starts discharging the capacitor, using a current generated by the constant current source, when the intermittent oscillation control circuit gives the instruction for the execution of the switching operation, and (ii) finishes the timing of the bottom-monitoring time period when a voltage of the capacitor goes below a voltage observed when the ringing cycle measuring circuit starts the charging.

9. The semiconductor device according to claim 6, wherein, after the intermittent oscillation control circuit gives the instruction for the execution of the switching operation, the bottom-monitoring time period timing circuit initializes the capacitor to an initial voltage when a gate signal of the switching element is brought to an ON level, the initial voltage being observed when the ringing cycle measuring circuit starts the charging.

10. The semiconductor device according to claim 1, further comprising an oscillating circuit which executes an oscillation operation regardless of the bottom of the ringing voltage to give an instruction for when to turn ON or turn OFF the switching element,
wherein the oscillating circuit (i) suspends the oscillation operation when the intermittent oscillation control circuit gives the instruction for the suspension of the switching operation, and, after the intermittent oscillation control circuit gives the instruction for the execution of the switching operation, (ii) resumes the oscillation operation when a gate signal of the switching element is brought to an ON level.

11. The semiconductor device according to claim 1, comprising the switching element, wherein the semiconductor device that includes the switching element is provided on a single semiconductor substrate.

12. A switching power supply device comprising:
the semiconductor device according to claim 1;
a converter which converts an input alternating current (AC) voltage into an output AC voltage, the input AC voltage being generated of the input DC voltage through the switching operation by the switching element; and
a smoothing circuit which converts the output AC voltage into the regulated output DC voltage.

13. A method for controlling a switching power supply that causes a switching element to intermittently execute a switching operation to alternately supply and cut an input direct current (DC) voltage so as to convert the input DC voltage into a regulated output DC voltage, the method comprising:
controlling intermittent oscillation to selectively give one of an instruction for execution of the switching operation and an instruction for suspension of the switching operation, according to a level of the regulated output DC voltage;
detecting, when the switching element is OFF, a bottom indicating a local minimum point of a ringing voltage that develops in the switching element;
timing a bottom-monitoring time period for which the bottom of the ringing voltage is to be monitored, the bottom-monitoring time period starting as soon as the instruction for the execution of the switching operation is given in the controlling the switching power supply; and
turning ON the switching element, while the bottom-monitoring time period is being timed, only when the bottom detecting circuit detects the bottom of the ringing voltage.

14. The method for controlling the switching power supply according to claim 13, further comprising forcefully turning ON the switching element when the timing of the bottom-monitoring time period ends, regardless of the bottom of the ringing voltage.

15. The semiconductor device according to claim 1, wherein the intermittent oscillation control circuit continues to give the instruction for suspension of the switching operation as long as a magnitude of a load represented by the regulated output DC voltage is smaller than a reference value.

* * * * *

UNITED STATES PATENT AND TRADEMARK OFFICE
CERTIFICATE OF CORRECTION

| | | |
|---|---|---|
| PATENT NO. | : 9,030,849 B2 | Page 1 of 1 |
| APPLICATION NO. | : 13/696037 | |
| DATED | : May 12, 2015 | |
| INVENTOR(S) | : Tetsuji Yamashita | |

It is certified that error appears in the above-identified patent and that said Letters Patent is hereby corrected as shown below:

On the title page,

In Item "(87) PCT Publ. No.:",
please delete "WO2011/015284", and add -- WO2011/158284 --.

Signed and Sealed this
Fifteenth Day of March, 2016

Michelle K. Lee
*Director of the United States Patent and Trademark Office*